(12) United States Patent
Chkodrov et al.

(10) Patent No.: US 7,571,187 B2
(45) Date of Patent: Aug. 4, 2009

(54) SUPPORT FOR REAL-TIME QUERIES CONCERNING CURRENT STATE, DATA AND HISTORY OF A PROCESS

(75) Inventors: Gueorgui Chkodrov, Redmond, WA (US); Zach Jason, Seattle, WA (US); Wayne A. Clark, North Bend, WA (US); Tolga Yildirim, Sammamish, WA (US); Lucy Chao, Bellevue, WA (US); Andrew Ng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1415 days.

(21) Appl. No.: 10/157,968

(22) Filed: May 31, 2002

(65) Prior Publication Data

US 2003/0225769 A1 Dec. 4, 2003

(51) Int. Cl.
*G06F 17/00* (2006.01)
(52) U.S. Cl. ............... 707/104.1; 707/101; 707/102; 707/103 R
(58) Field of Classification Search ............. 707/1–10, 707/100–104.1, 200–206; 709/220–226
See application file for complete search history.

(56) References Cited

U.S. PATENT DOCUMENTS 6,643,696 B2 * 11/2003 Davis et al. ................. 709/224

| | | | |
|---|---|---|---|
| 2003/0009705 A1 * | 1/2003 | Thelander et al. | 713/340 |
| 2003/0055677 A1 * | 3/2003 | Brown et al. | 705/1 |
| 2003/0061506 A1 * | 3/2003 | Cooper et al. | 713/201 |

OTHER PUBLICATIONS

U.S. Appl. No. 10/160,844, filed May 31, 2002.
"BizTalk Orchestration A Technology for Orchestrating Business Interactions White Paper", Microsoft Corporation, Jun. 5, 2000, pp. 1-10.

* cited by examiner

*Primary Examiner*—Isaac M Woo
(74) *Attorney, Agent, or Firm*—Birch, Stewart, Kolasch & Birch, LLP

(57) ABSTRACT

A computer-implemented method is provided for defining interesting portions of a workflow of a business or other type of process. Using a tracking profile editor, a portion of a given workflow is selected and associated with a named process part. Items of payload data to be used in reports are selected from a message schema associated with the given workflow. A profile is generated based on the given workflow and the selected items of payload data. A tracking profile compiler receives the created tracking profile and generates a star schema, a flattened view and OLAP cube based on the tracking profile. An interceptor extracts monitored workflow events and stores event information to a tracking stream, based on the tracking profile. A tracking service extracts information pertaining to the monitored events from the tracking stream and stores the information in the queryable database. The OLAP cube and the flattened view are updated based on the information written to the queryable database.

26 Claims, 31 Drawing Sheets

LoanProcess CUBE

ProcessState: Running

|  |  |  | Duration | | | |
|---|---|---|---|---|---|---|
|  |  |  | 10 | 20 | 30 | Grand Total |
| (O1 data) | (O2 data) | (O3 data) | Amount | Amount | Amount | Amount |
| ⊟ LoanProcess | ⊟ Approved | CheckCreditHistory | 1000000 | 1580000 | 860000 | 3440000 |
|  |  | CheckAppraisal | 1000000 | 1580000 | 860000 | 3440000 |
|  |  | Total | 1000000 | 1580000 | 860000 | 3440000 |
|  |  | ObtainSignature | 780000 | 680000 | 640000 | 2100000 |
|  |  | Closing | 360000 |  | 420000 | 780000 |
|  |  | Cancellation | 420000 | 200000 | 220000 | 840000 |
|  |  | Total | 780000 | 680000 | 640000 | 2100000 |
|  | ⊞ Denied |  |  | 900000 |  | 900000 |
|  | Total |  | 1000000 | 1580000 | 860000 | 3440000 |

Figure 27

SUPPORT FOR REAL-TIME QUERIES CONCERNING CURRENT STATE, DATA AND HISTORY OF A PROCESS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to methods and computer systems for monitoring a workflow representing a business or other type of process. More particularly, the present invention relates to methods and computer systems for monitoring such a workflow and allowing a user to formulate queries and receive information related to execution of specific portions of the workflow.

BACKGROUND OF THE INVENTION

Computer systems for monitoring workflows representing business processes can be used to provide information regarding the number of instances of a workflow that are running. For example, Microsoft Corporation's BizTalk™ server executes long-running workflows (Orchestration Schedules) that represent business processes (cases). To achieve reliability and transactional support, the BizTalk™ server saves the state of the running instances in a Microsoft SQL™ database. Thus, an instance of a business process can be "running" indefinitely. A further high-level description of BizTalk™ Orchestration can be found in the white paper, "BizTalk Orchestration, A Technology for Orchestrating Business Interactions", Microsoft Corporation, 2000.

Therefore, in a typical business that uses BizTalk™ Orchestration, at any moment of time, there will be many instances that are "running" (representing business cases being processed) and having reached different states of completion.

Very often, in order to make informed business decisions it is crucial to know metrics of how the business cases are processed, and the state of the cases currently being processed. The ability to obtain information, such as answers to the following questions, may help one to make informed business decisions:

Which part of the business process is a performance bottleneck?
In which part of the workflow is the business losing customers most often?
What is the dollar amount that is involved in the purchase orders that customers are waiting for a partner to fulfill?
In which cities is the business sluggish?
What are the trends regarding any of the above questions?

The Orchestration engines of Biztalk™ 2000 and Biztalk™ 2002 allow a user to obtain the number of running schedules and their instance IDs (GUIDs). However, current known workflow monitoring systems, including Microsoft Corporation's BizTalk™ 2000 and Biztalk™ 2002, do not provide information such as the answers to the above questions.

SUMMARY OF THE INVENTION

The present invention addresses the above situation by, e.g., allowing users to interactively define process parts of a given workflow that are of interest to a respective user, and by allowing users to select payload data items of interest from a message schema for reporting purposes. A tracking profile is generated based on the defined process parts and the selected payload data items. Process instances are monitored and reports are generated based on parameters established by the tracking profile.

In a first aspect, the invention provides a method of establishing a tracking profile for selective monitoring and reporting of process state data pertaining to a displayed workflow representation of a process. At least one portion of the displayed workflow representation is selected and associated with respective process part labels. A tracking profile is generated based on the selected workflow representation portion(s). The profile establishes parameters for monitoring and writing to a queryable database process state data pertaining to instances of the process represented within the displayed workflow representation. Preferably, the method further includes selecting, from a message schema associated with the displayed workflow representation, items of payload data to be used in reports, and the tracking profile is further based on the selected items of payload data.

In a second aspect, the invention provides a machine readable medium that has instructions recorded thereon. When the instructions are executed by a data processing device, the data processing device is configured to permit a user to select, with at least one input device, at least one portion of a displayed workflow representation, and to associate the selected portion(s) with respective process part labels. The data processing device is further configured to generate a tracking profile based on the selected workflow representation portion(s). The profile establishes parameters for monitoring and writing, to a queryable database, process state data pertaining to instances of the process. Preferably, the machine readable medium further has instructions recorded thereon, such that when the instructions are executed by the data processing device, the data processing device is further configured to permit the user to select, with the input device(s), items of payload data to be used in reports, from a message schema associated with the displayed workflow representation. In this implementation, the tracking profile is further based on the selected items of payload data and the profile is further for establishing parameters for monitoring and writing to a queryable database payload data pertaining to instances of the process.

In a third aspect, the invention provides a data processing apparatus for establishing a tracking profile for selective monitoring and reporting of process state data pertaining to a displayed workflow of a process. A workflow representation of a process is stored on at least one data storage device. A display is provided for displaying the workflow representation. A processor is operatively connected to the storage device(s), the display and at least one user input device. At least one of the data storage devices has stored thereon a set of instructions which, when executed, configure the processor to permit a user to select, with the input device(s), at least one portion of the displayed workflow representation and to associate the selected portion(s) with receptive process part labels. A tracking profile is generated based on the selected workflow representation portion(s). The profile establishes parameters for monitoring and writing, to a queryable database, process state data pertaining to instances of said process. Preferably, the data processing apparatus is further for selective monitoring and reporting of payload data pertaining to the displayed workflow representation. In this implementation, the data storage device(s) has instructions stored thereon, which, when executed, further configure the processor to permit a user to select, with the input device(s), items of payload data to be used in reports, from a message schema associated with the displayed workflow representation. The generated tracking profile is further based on the selected items of payload data and further establishes parameters for monitoring and writing queryable database payload data pertaining to instances of the process.

In a fourth aspect, the invention provides a data processing system for monitoring and reporting process state data pertaining to instances of a process represented within a stored workflow representation. The system includes at least one data storage device having the workflow representation stored thereon. A queryable database having a schema established based upon a tracking profile is provided. The tracking profile is based on one or more selected portions of the stored workflow representation. A monitoring means is provided for monitoring process state data pertaining to instances of the process. Monitoring is performed within parameters established by the tracking profile. The monitoring means is further for writing the process state data to the database in accordance with the database schema. A reporting means is provided for selectively reporting process state data written to the database, in accordance with parameters established by the tracking profile. Preferably, the system is further for monitoring and reporting payload data pertaining to instances of the process represented by the stored workflow representation. In this implementation, the tracking profile is further based on items of payload data from a message schema associated with the stored workflow representation. The monitoring means is further for monitoring payload data pertaining to instances of the process, within parameters established by the tracking profile, and for writing the payload data to the database, in accordance with the database schema. The reporting means is further for selectively reporting payload data written to the database, in accordance with the parameters established by the tracking profile.

In a first aspect, the invention provides a method for monitoring and reporting process state data pertaining to instances of a process represented within a stored workflow representation, utilizing a data processing system including at least one data storage device having stored thereon the workflow representation and a queryable database. The database has a schema established based upon a tracking profile. The tracking profile is based on one or more selected portions of the stored workflow representation. In the method, process state data pertaining to instances of the process is monitored within parameters established by said tracking profile. The process state is written to the database in accordance with the database schema. The process state data written to said database is selectively reported, in accordance with parameters established by said tracking profile. Preferably, the method is further for monitoring and reporting payload data pertaining to instances of the process represented within the stored workflow representation. In this implementation, the tracking profile is further based on items of payload data selected from a message schema associated with the stored workflow representation. Monitoring further includes monitoring of payload data pertaining to instances of the process, within parameters established by the tracking profile, and writing the payload data to the database in accordance with the database schema. The payload data written to the database is selectively reported, in accordance with parameters established by the tracking profile.

The above and other objects, features and advantages of the present invention will be readily apparent and fully understood from the following detailed description of preferred embodiments, taken in connection with the appended drawings.

BRIEF DESCRIPTION OF THE DRAWINGS

The present invention is described with respect to the accompanying figures, in which like reference numerals identify like elements, and in which:

FIG. 27 is a screen shot demonstrating results of changing the measure "Count" of the exemplary display shown in FIG. 24 to "Amount";

DETAILED DESCRIPTION OF THE PREFERRED EMBODIMENTS

Exemplary Operational Environment

Figure 1:
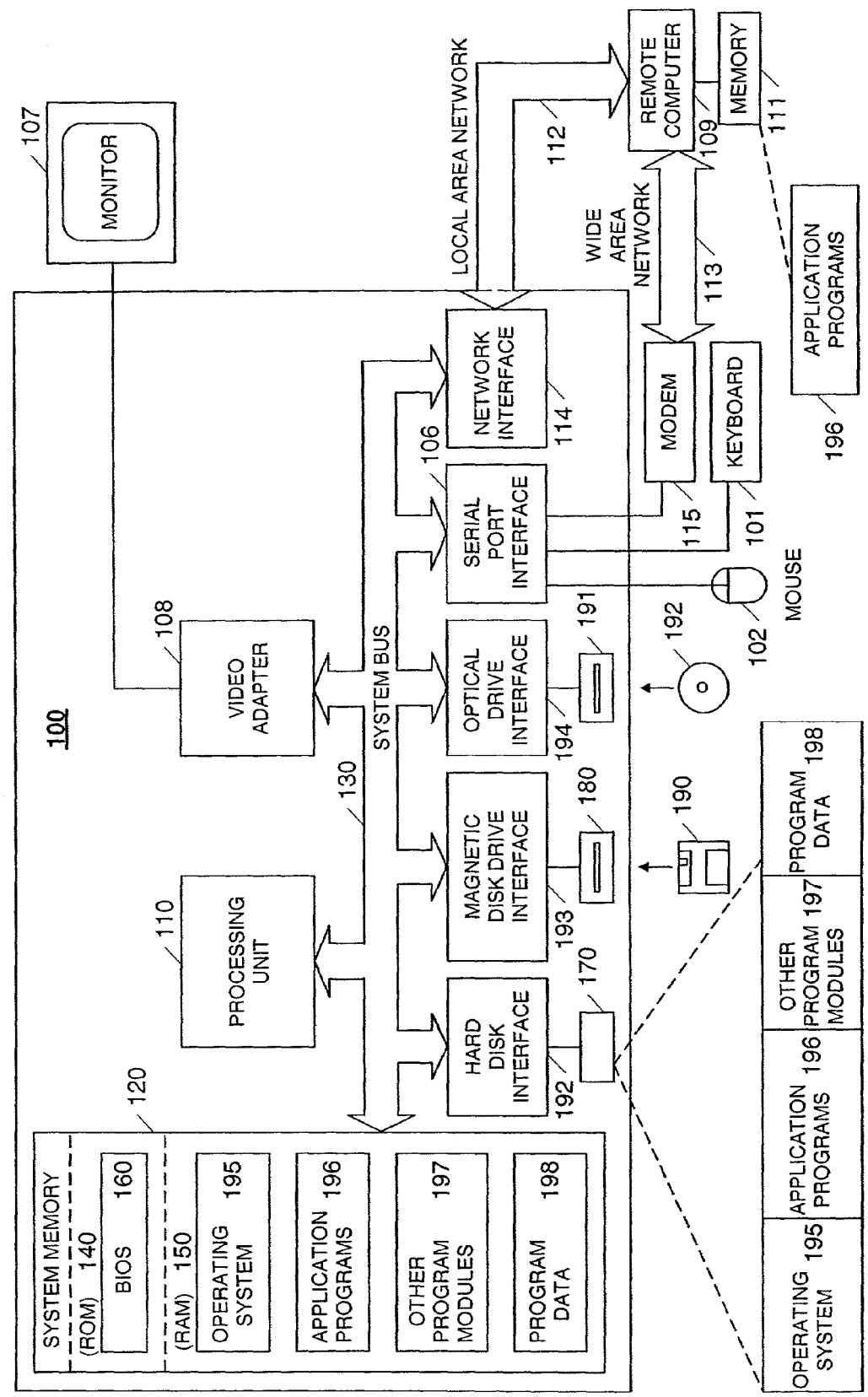
FIG. 1 is a schematic diagram showing a general purpose computer with which an embodiment of the invention may be practiced.

The conventional general-purpose digital computing environment illustrated in FIG. 1 can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during startup, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on hard disk 170, magnetic disk 190, optical disk 192, ROM 140 or RAM 150, including an operating system 195, one or more application programs 196, other program modules 197, and program data 198. A user can enter commands and information into computer 100 through input devices, such as keyboard 101 and pointing device 102. These and other input devices are often connected to the processing unit 110 through a serial port interface 106 that is coupled to the system bus, but may be connected by other interfaces, such as a parallel port, a game port or a universal serial bus (USB). The computer may also include a monitor 107 or other type of display device connected to system bus 130 via an interface, such as a video adapter 108. In addition to the monitor, personal computers typically include other peripheral output devices (not shown), such as printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

Figure 2:
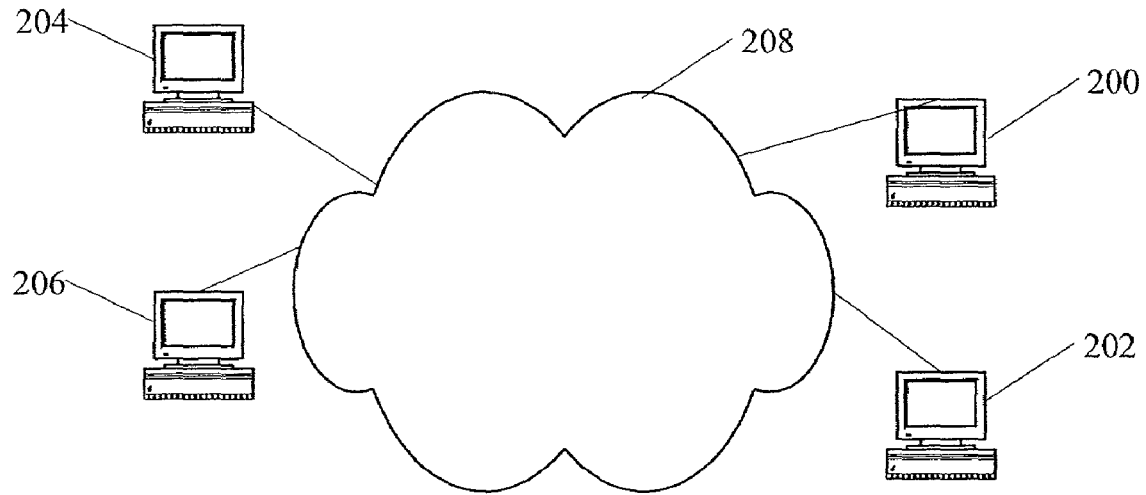
FIG. 2 illustrates an exemplary networking environment with which an embodiment of the invention may be practiced.

An embodiment of the invention may reside in one or more servers 200, 202 executing server software or firmware, as seen in the networking diagram of FIG. 2. One or more user devices 204, 206 executing client software or firmware may connect to one or more of the servers via a network 208. Network 208 may be a local area network, a Wide Area Network, or a network of networks, such as, for example, the Internet.

Each of servers 200, 202 and user devices 204, 206 may be a computer as described in FIG. 1. The user devices 204, 206 may include specialized software or firmware for communicating with applications executing in the server, or user devices 204, 206 may include a browser application for such communications with one or more servers.

Processing Overview

Figure 3:
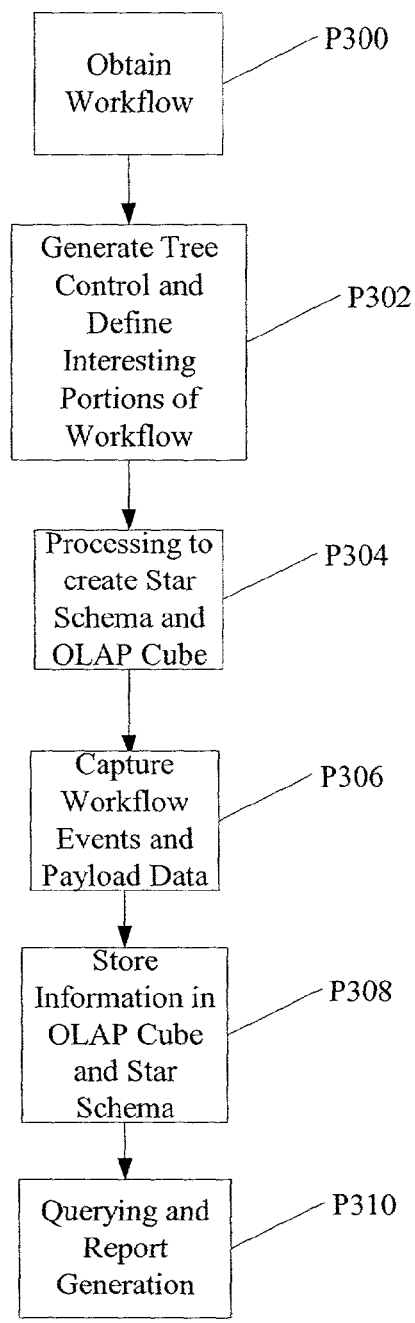
FIG. 3 is a flowchart that illustrates an overall process flow according to the invention.

FIG. 3 provides a high level illustration of a flow process in accordance with the invention. At P300, a predefined workflow is obtained. In an exemplary application of the invention, the workflow, and an associated message schema describing payload data associated with the workflow, are predefined using Microsoft's Orchestration Designer of the BizTalk™ server. Other applications for describing workflows and message schemas may be used as well.

At P302, a tree control is generated. Initially the tree control includes a display showing a label, such as a name of one or more predefined workflows or schedules. Using the displayed tree control, a user may select a desired workflow. Once that workflow is displayed, the user may proceed to define one or more portions of the workflow as one or more process parts. The process parts are those portions of the workflow that the user has a particular interest in for reporting purposes. Using an associated message schema and the tree control, the user can define the types of payload data that are to appear in reports.

At P304, a star schema (to be described later) and an OLAP cube are created.

At P306, the given workflow is activated and events corresponding to defined process parts and payload data for reports are captured and saved in a tracking stream.

At P308, the stored events and payload data are extracted from the tracking stream and stored in queryable form. That is, the stored events and payload data are stored in the star schema and the OLAP cube.

At P310, reports are generated based on the OLAP cube and on the star schema in response to one or more queries.

OLAP (on line analytical processing) is a well-known computer processing technique for summarizing, consolidating, viewing, applying formula to and synthesizing data according to multiple dimensions. OLAP software permits different users to gain insight into the performance of an enterprise through rapid access to a wide variety of data views that are organized to reflect the multi-dimensional nature of the enterprise performance data. A popular model for OLAP applications is the OLAP cube, also known as a multi-dimensional database (MDDB).

Detailed Description of Process/System Components

Figure 4:
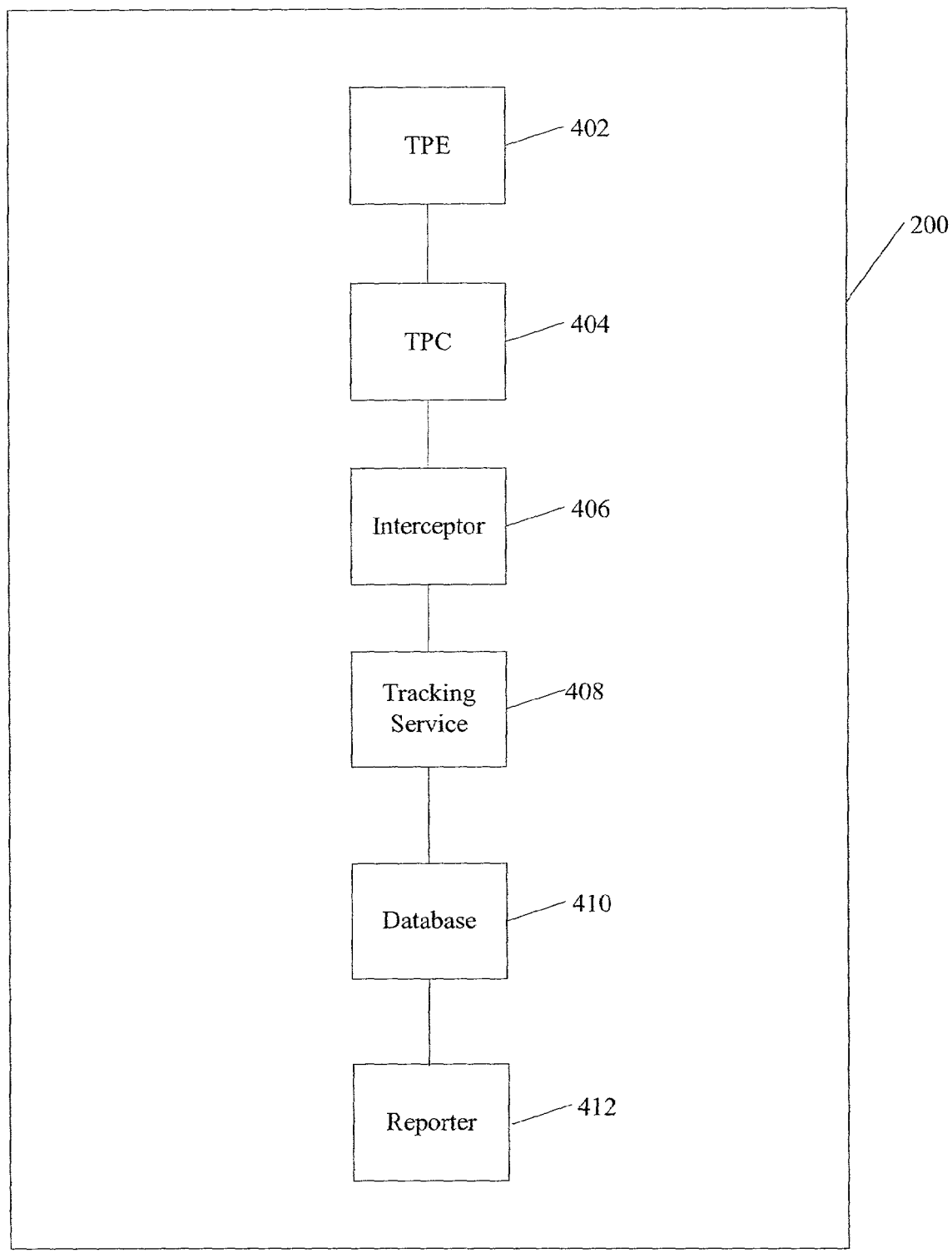
FIG. 4 is a functional block diagram illustrating the functional components of an embodiment of the invention that may be practiced in the environments of FIGS. 1 and 2.

Referring to the functional block diagram of FIG. 4, a Tracking Profile Editor (TPE) 402 is provided for defining interesting portions of a given workflow as process parts. TPE 402 further is for defining those items of the payload data, defined by the message schema of the workflow, that are to appear in reports. TPE 402 creates a tracking profile that describes the process parts, the types of payload data for reports, and any defined custom measures (to be discussed later).

Tracking Profile Compiler (TPC) 404 receives a tracking profile generated by TPE 402 and generates a runtime interceptor configuration that describes types of events and payload data that are to be captured, stored procedures for storing captured information into a database in queryable form, a flattened view of a star schema, a star schema, an OLAP cube, and a data transformation task (DTS) task to cause the OLAP cube to be updated periodically from data in the star schema database. (See FIG. 12.)

Interceptor 406 monitors events from an instance of a workflow and causes events corresponding to the process parts and the payload data for reports to be persisted to a tracking stream.

Tracking Service 408 causes the saved events and payload data from the tracking stream to be stored in queryable form using the stored procedures generated by the TPC 404.

Reporter 412 produces reports based on queries and the data in the database, the flattened view, and/or the OLAP cube.

TPE 402, TPC 404, interceptor 406, and tracking service 408 may physically reside as application programs 196 in one device or may reside in more than one device. For example, TPE 402 and TPC 404 may reside in one device, interceptor 406 and tracking service 408 may reside in a second device, and database 410 and reporter 412 may reside in a third device. Any communications between the above optionally distributed components may occur over a network or a series of networks connecting the devices.

Figure 5:
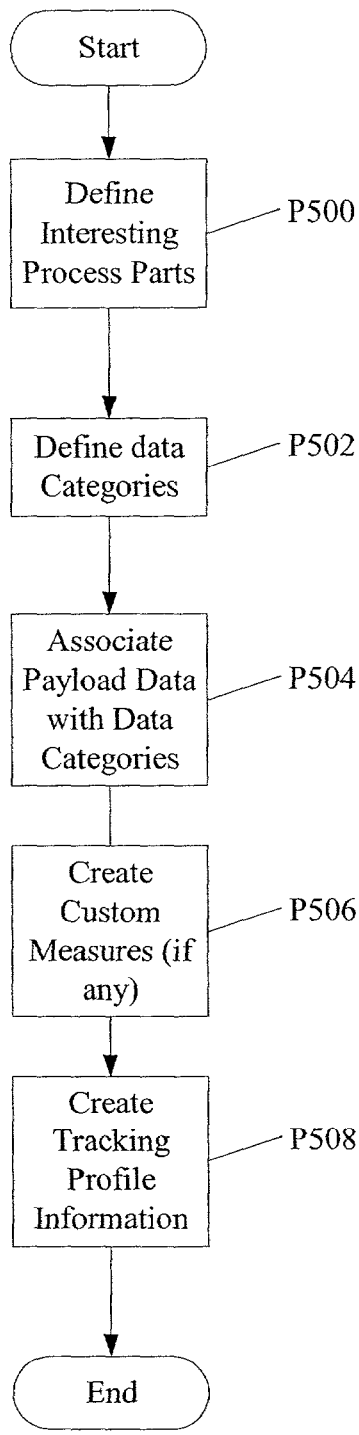
FIG. 5 is a flowchart illustrating processing of the transaction profile editor shown in FIG. 4.

The flowchart of FIG. 5 describes the steps performed by and with TPE 402 in an exemplary embodiment of the invention. At P500, a user defines interesting process parts of the given workflow. (This process is described in more detail below.)

At P502, the user defines new data categories for reporting purposes and associates payload data from a message schema of the workflow with the new data categories. The associated payload data is to be used for reports that are generated in response to queries.

At P506, the user may define one or more items of payload data as a custom measure. When an item of payload data is defined as a measure, the user can choose an aggregation function. The aggregation function may include, e.g., a count, for counting a number of the data items; sum, for adding the data items; min, for providing a minimum value of the data items; and max, for providing a maximum value of the data items.

At P508, a tracking profile is created. The tracking profile may be in the form of an XML file, may have a customized extension, such as .btt, or may be in any other format capable of storing information describing the defined process parts along with their corresponding labels, such as names, the relationships among the process parts, the payload data to be used for reports, and the custom measures.

Figure 6:
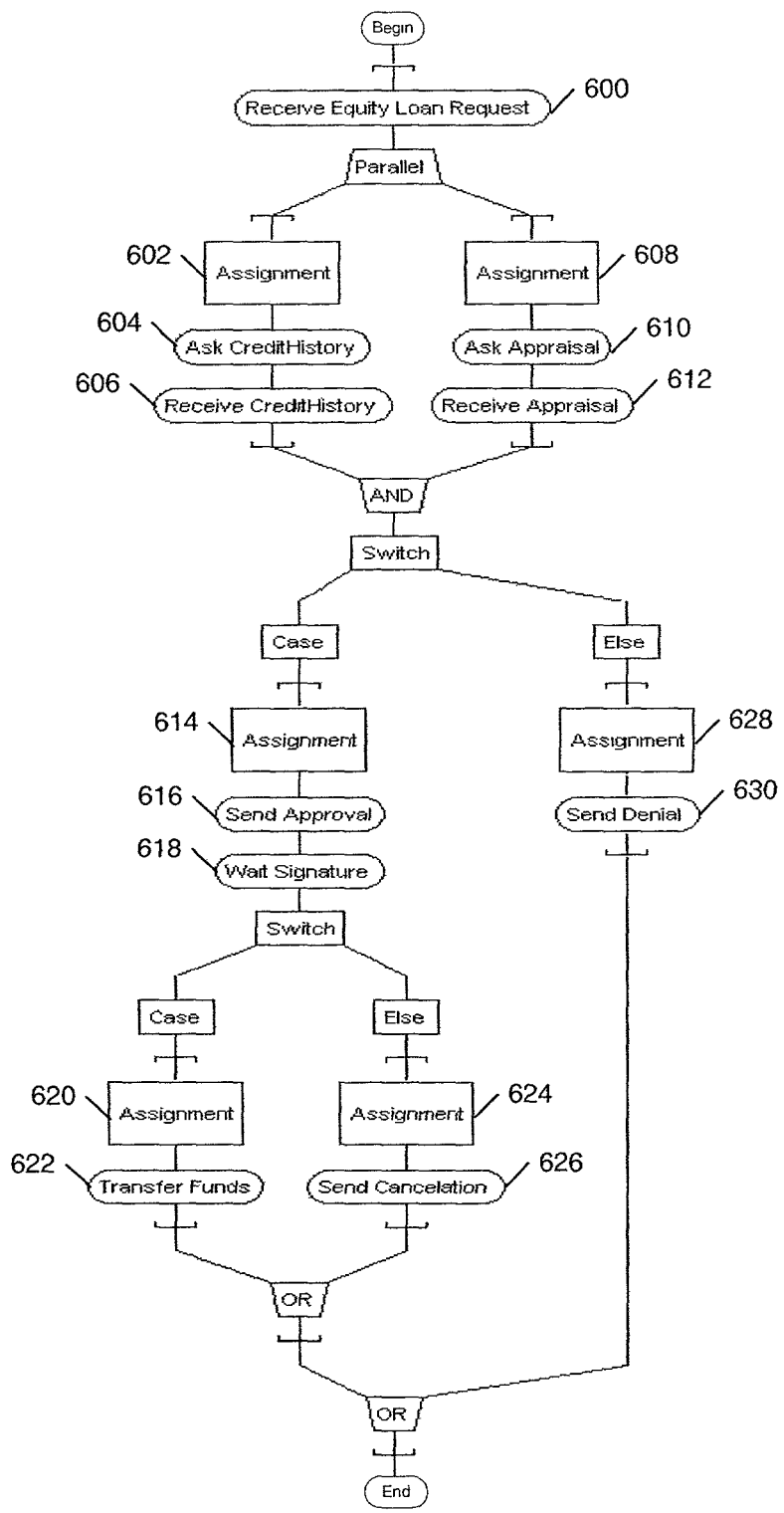
FIG. 6 illustrates an exemplary workflow created with BizTalk™ Orchestration, serving as a vehicle for explaining exemplary applications of the invention.

Referring to FIG. 6, an exemplary business workflow to which the invention may be applied is illustrated. The workflow may be defined using BizTalk™ Orchestration, available from Microsoft Corporation, which may be executed on a BizTalk™ server.

The exemplary workflow describes a process for receiving and processing loan requests. The workflow could be any type of process, including online (e-commerce) and conventional business and non-business processes, as well as processes that combine online and conventional (off-line) aspects.

Employing the BizTalk™ server, for example, a new instance of a business process will be instantiated when an XML message with a predefined message schema is received (i.e., a customer completes an online loan application). At 600 in the workflow, an equity loan request or application is received. The loan request may be (but is not necessarily) received via a computer network after a prospective customer completes an on-line application form for a loan. Following receipt of the loan request, two portions of the workflow are performed in parallel. At 602, a new message is constructed that will be sent to a credit bureau to verify the credit history of the applicant. Payload data, such as Name and SSN are extracted from an original message and assigned to parts of the new message. At 604, a message requesting a credit history is generated and sent. At 606, a message containing the requested credit history is received.

In the parallel portion of this workflow, at 608, payload data is extracted from the original message and assigned to parts of a new message for requesting an appraisal. At 610, the appraisal request message is generated and sent to request an appraisal of the property. At 612, an appraisal response message is received.

Once the credit history and the appraisal are received, one of two branches may be taken. In the first branch, at 614, payload data is extracted from the original message and assigned to parts of a new message for indicating loan approval. At 616, the message indicating approval of the loan is sent to the prospective customer, and at 218, the process waits for the signature of the prospective customer.

When the signature is received electronically, at 620 payload data is extracted from the original message schema and assigned to parts of a new message for requesting the transfer of funds. At 622, the loan funds request message is sent to request that the loan funds be transferred to the customer.

If, while waiting for the signature at 618, the prospective customer cancels the loan request or the loan request is automatically canceled after waiting for the signature a predetermined amount of time, for example, two weeks, then at 624 payload data is extracted from the message schema and assigned to appropriate variables, and at 626, a cancellation message is generated and sent to the prospective customer to indicate cancellation of the loan request.

If, after receiving the credit history at 606 and the appraisal at 612, and either the credit history or the appraisal does not meet specific requirements, at 628, payload data is extracted from the original message and assigned to parts of a newly created denial message, and at 630, the denial message is generated and sent to the prospective customer to indicate that the loan request is denied.

In a process, such as that which is shown in the exemplary workflow, at any given moment, there may be multiple instances of the process in different states of completion that are waiting for a particular message (i.e., more than one loan request outstanding in the illustrated loan process). Further, different instances may have different payload data. For example, the dollar amount and duration of the requested loan, and the location and type of the property, will differ from one instance to another.

In accordance with the invention, meaningful areas of the workflow can be identified such that queries related to the execution of the business process can be made regarding those areas. For example, the following business questions relating to the exemplary loan application process may be formulated:

1. What is the average duration of "credit history verification" compared to "appraisal"? If one has an average duration that is much longer than the other, it may not make sense to run this portion of the workflow in parallel.
2. What is the dollar amount of those instances of the processes that are approved? That is, what is the amount already promised for loans?
3. How often is a loan cancelled by an applicant after approval, and is there a trend such that an increasing percentage of loan applications are being cancelled by applicants? If this rate is increasing, maybe the Annual Percentage Rate (APR) should be adjusted.
4. Which instances of the workflow have been waiting for a signature from the applicant longer than a predetermined amount of time, for example, two days? It may be useful to contact these applicants in order to attempt to persuade them to close the loan.

Data permitting these types of questions to be answered can be made readily accessible utilizing the processes/systems of the invention.

Figure 7:
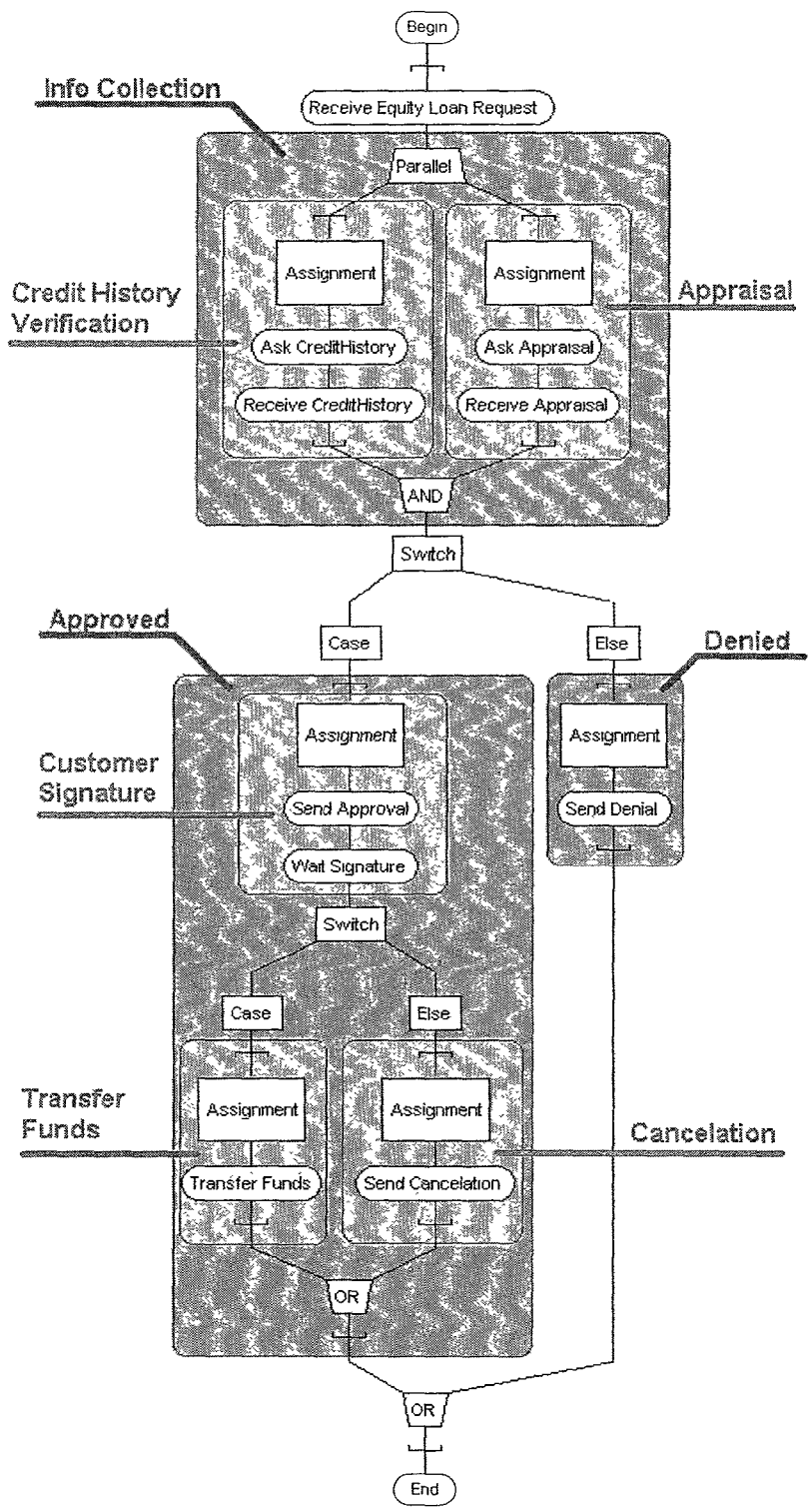
FIG. 7 shows the exemplary workflow of FIG. 6 with interesting portions defined.

As mentioned previously, a user may define interesting portions of the workflow (i.e., process parts). Referring to FIG. 7, selected interesting portions of the exemplary workflow (including sub-portions) may be seen. For example, the Info Collection portion of the workflow includes, as sub-portions, a Credit History Verification portion, in which a credit history is requested and received, and an Appraisal portion, in which an appraisal is requested and received. An Approved portion of the workflow includes, as sub-portions, a Customer Signature portion, in which loan approval is sent to the customer and the process waits for the customer's signature, a Transfer Funds portion, in which requested funds are transferred to the customer, and a Cancellation portion, in which the loan request is cancelled. A Denied portion includes sending a denial to a prospective customer when either the received credit history or the received appraisal do not meet predetermined standards.

Figure 8:
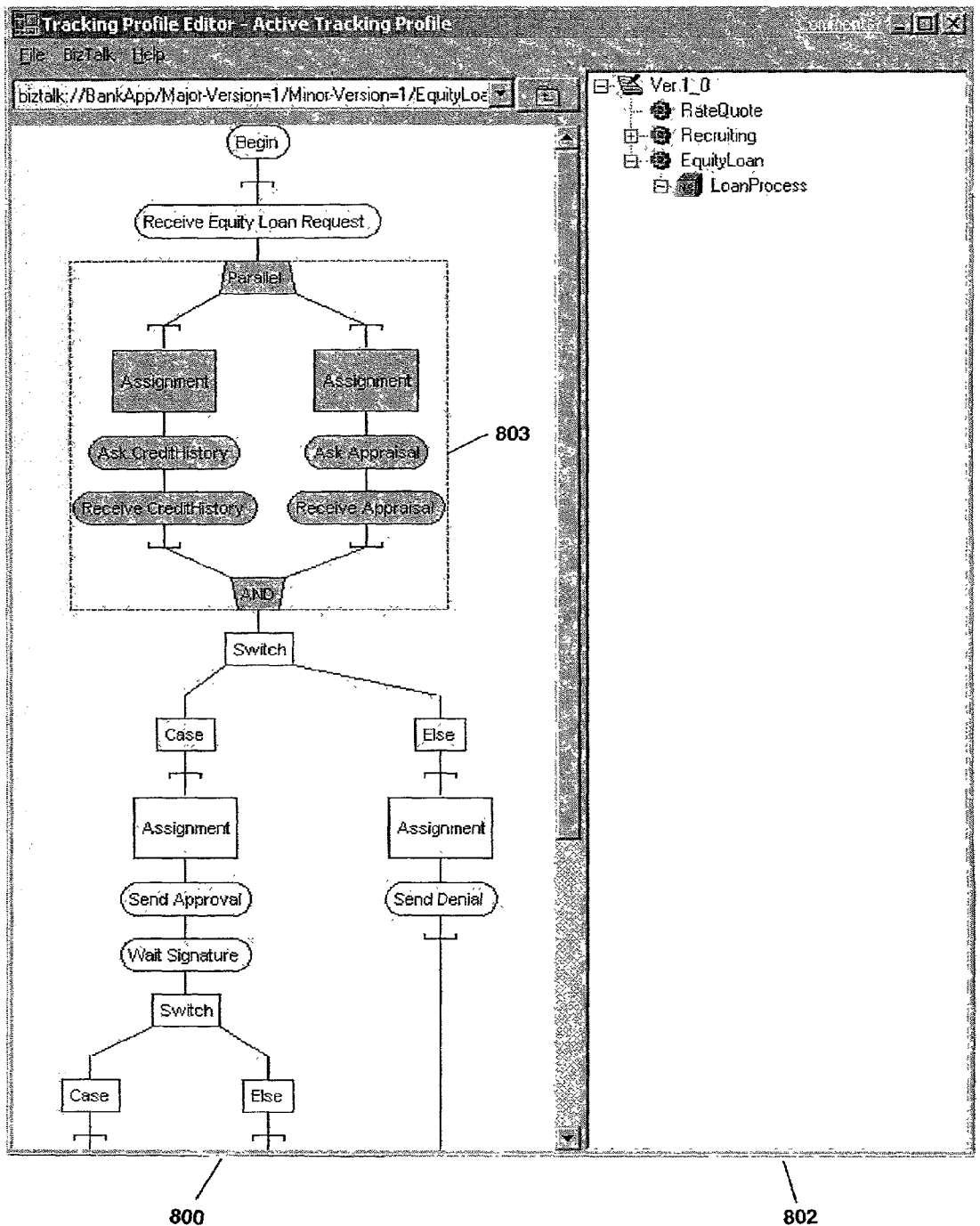
FIG. 8 is a screen shot illustrating the exemplary workflow of FIG. 6, and an associated tree control.

With reference to FIG. 8, the process of defining interesting portions or process parts of a business process using the exemplary embodiment of TPE 402 is explained using the exemplary loan application process. Using TPE 402, a user may select a predefined application that includes a workflow, such as one containing the exemplary loan application process workflow. For example, TPE 402 may display a tree control 802 initially simply listing predefined applications. In the exemplary screen shot, predefined applications Rate-Quote, Recruiting and EquityLoan appear. To access the exemplary loan application process workflow, the user may select EquityLoan by using an input device, such as a pointing device to click on EquityLoan. This brings up the corresponding workflow display appearing on the left side.

After selecting the application containing the desired workflow, the user may use TPE 402 to create a report cube. A report cube is a cube, such as an OLAP cube, for providing reports based on instances of the workflow. The report cube will contain process parts that are of interest to the user and interesting items of the payload data. To create the report cube in the exemplary embodiment, the user may, e.g., right click on the name of the EquityLoan application in the tree control and may then select "define report cube" from a context menu. Upon defining the report cube, the user will be asked to name the report cube. In the exemplary illustration, the user has named the report cube "LoanProcess" as shown in tree control 802.

To define an interesting process part, the user may right click on LoanProcess and select "New Process" from a context menu. The user may then be prompted for a process part label, such as a name. For example, the user may enter "Info-Collection" as the process part name. The process part name "InfoCollection" may then appear in tree control node 802. (See FIG. 9.) Similarly, the user may define child process parts of "InfoCollection". For example, the user may right click on "InfoCollection" in the tree node and select "New Process" from the context menu. The user may then be prompted for a process part name and may then name the new process part, for example, "CheckCreditHistory." The above operations may be repeated again to create the process part named "CheckAppraisal".

Figure 9:
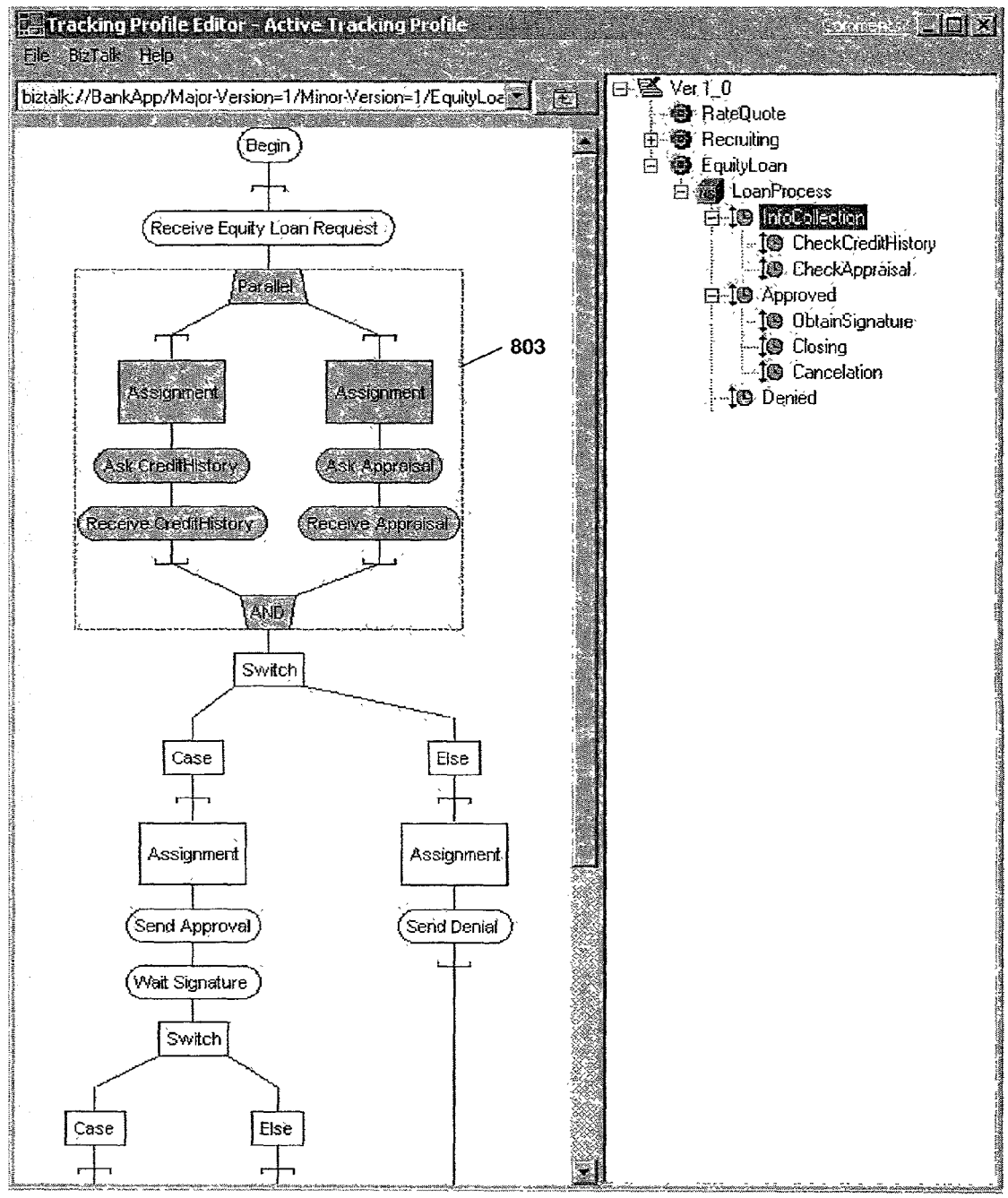
FIG. 9 is a screen shot showing the exemplary workflow of FIG. 8, and the tree control of FIG. 8 with process parts added.

Similarly, the user may define the process part named "Approved" by, for example, right clicking on "LoanProcess", selecting "New Process" from the context menu, and naming the new process "Approved" in response to the prompt asking for the new process name. Child processes of "Approved" may be defined by right clicking on "Approved" in the tree control and defining new processes "ObtainSignature", "Closing", and "Cancellation" in the same manner as described above. The tree control of FIG. 9 shows defined process parts InfoCollection (with child process parts "CheckCreditHistory" and "CheckAppraisal"), "Approved" (with child process parts "ObtainSignature", "Closing" and "Cancellation"), and process part "Denied".

After defining the process part names in the tree control of the illustrative embodiment, the user will then associate each of the process part names with a portion of the workflow. For example, to associate the "InfoCollection" process part with a portion of the workflow, the user may select "InfoCollection" in the tree control by, for example, clicking on "InfoCollection." The user may then select the desired portion from the workflow by selecting (i.e., right clicking on) the box labeled "Parallel" to select the portion of the workflow labeled 803 in FIGS. 8 and 9 and then selecting "define" from a context menu to define the selected process part, "InfoCollection" to include selected portion 803 of the workflow.

Similarly, process part "CheckCreditHistory" may be associated with a portion of the workflow by selecting "CheckCreditHistory" from the tree control and then selecting the three consecutive workflow items labeled, "Assignment", "AskCreditHistory", and "ReceiveCreditHistory". This may be done in a variety of ways. As one example, "Assignment" may be selected (i.e., clicked) and then, while holding down a SHIFT key of a keyboard, "ReceiveCreditHistory" may be selected. The user may then right click on the selected portion and select "define" from a context menu to define the "CheckCreditHistory" process part to include the three selected items from the workflow.

Various other methods may be used to select portions of the workflow and associate the selected portion with a named process part. For example, the user may select the desired portions of the workflow by clicking and dragging a cursor around one or more desired objects of the workflow, dragging the selected group of objects to the tree control, and dropping the group onto a named parent process part of the tree control. As an illustration, to select objects for the InfoCollection process part utilizing this method, the user would click and drag the cursor around objects 803, and drag and drop the grouped objects to "InfoCollection" in the tree control.

In the illustrative embodiment, to define categories of data to be extracted for queries and aggregation, a user may, right click on the report cube, for example, "LoanProcess" in tree control 802 and select "new data category" from a context menu. The user may then be prompted for a data category name, for example, "Location". Data category, "Location", will then be defined in tree control 802. (See FIG. 10.)

Figure 10:
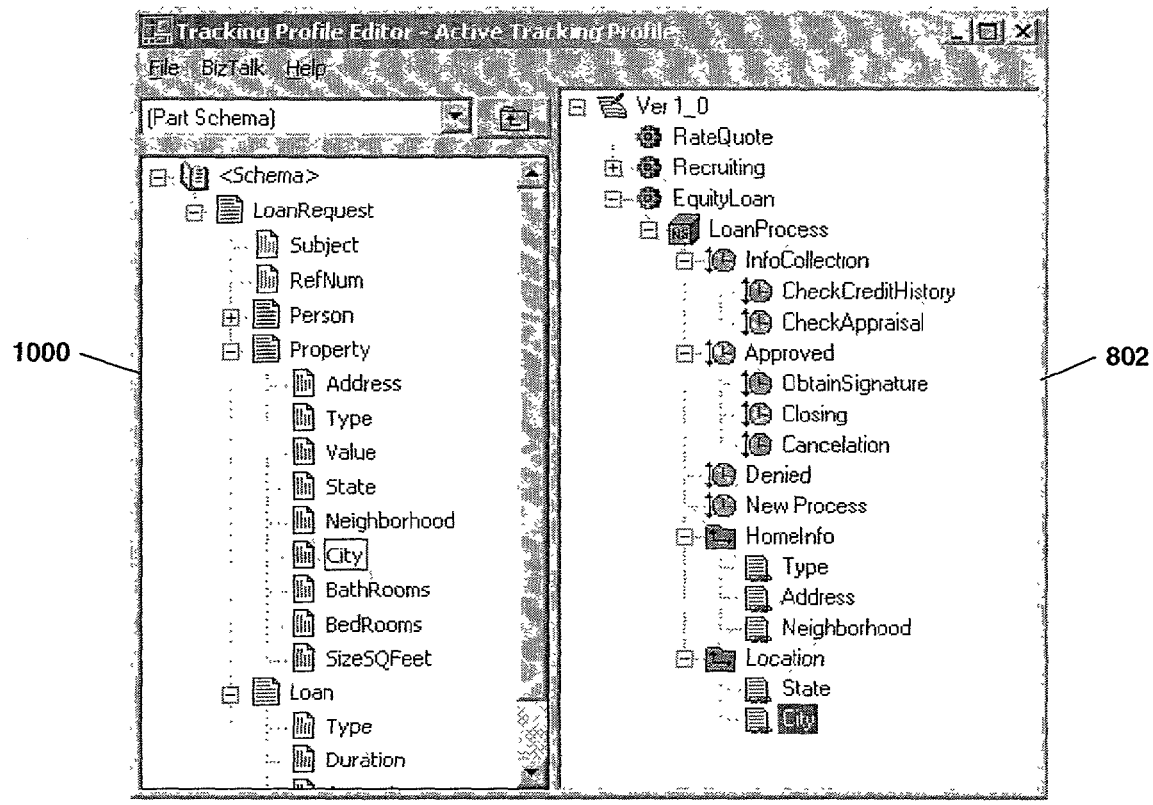
FIG. 10 is a screen shot showing a message schema for the workflow of FIGS. 8 and 9 and a tree control showing defined process parts and data for reporting.

In order to indicate exactly which payload data items from the workflow should be extracted for reports, in the exemplary embodiment, the user may select some portion of the workflow by, for example, right clicking on the portion of the workflow and selecting "display message schema" from a context menu to display the message schema associated with the selected portion of the workflow. The user may then drag and drop data items into categories. Referring to FIG. 10, a user may drag, for example, "City" from the message schema shown at 1000 to the "Location" data category shown at tree control 802, resulting in "City" being defined under the "Location" data category of tree control 802.

After the payload data items are defined within data categories, the payload data items may be renamed to friendly names that may appear in reports. For example, a user may right click on "City", appearing in tree control 802, and select a rename option from a context menu, allowing the user to rename "City" to any desired name, such as, for example, "Town". The name "Town" may then appear in future reports. Preferably, the friendly names are unique within each category.

Figure 11:
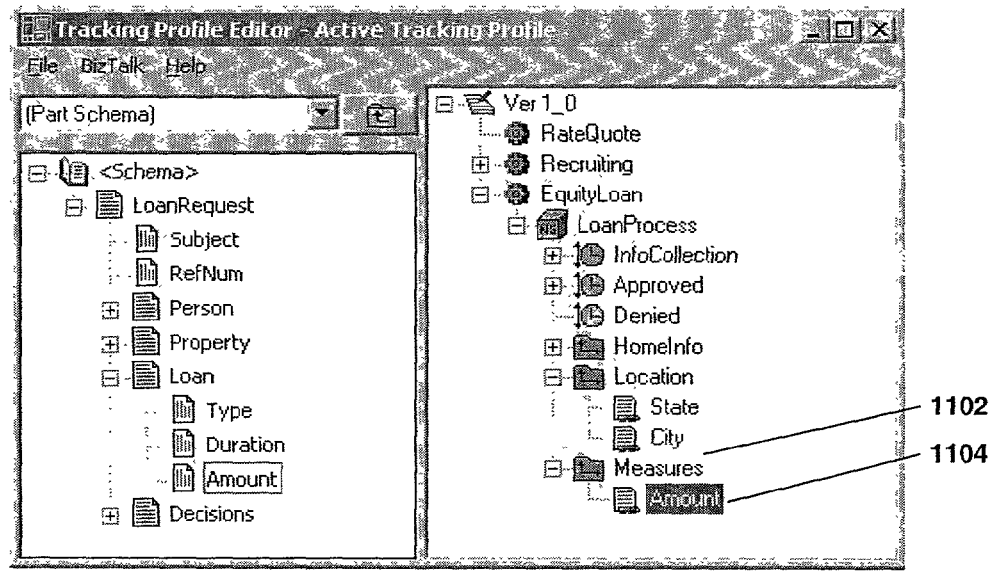
FIG. 11 is a screen shot illustrating the message schema and the tree control of FIG. 10, with items defined as measures.

Data items may also be used as measures. When a data item is defined as a measure, the user can choose an aggregation function. The aggregation function may include, e.g., count, for counting a number of the data items; sum, for adding the data items; min, for providing a minimum value of the data items; and max, for providing a maximum value of the data items. To define a measure in the exemplary embodiment, a user defines a data category with a reserved name, such as "measures" and drags the payload data item of interest from the message schema, shown at 1000 to the "measures" data category. FIG. 11 shows data category, "Measures" 1102 defined within the tree control, with payload data item, "Amount" defined within "Measures". Thus, the aggregation functions defined previously may be used with payload data item "Amount".

As described above, tracking profile editor (TPE) 402 can be used to define data and process metrics (a tracking profile) that may be used for reporting. This output of TPE 402 may be saved, for example, as an XML file or a file with a specialized file extension, such as ".btt." The user may activate the data tracking by making a menu selection from a main menu and activating a tracking profile compiler 404 and interceptor 406. As will be described, an OLAP cube and a star schema may be created by the tracking profile compiler based on the data and process metrics definitions created with TPE 402.

The defined data categories, as shown in FIGS. 10 and 11, may be used as dimensions of an OLAP cube. Based on the structure defined in the above tree control and the mapping to the business process workflow. Tracking Profile Compiler 404 may be executed to create a star schema, a flattened view and a corresponding OLAP cube.

Figure 12:
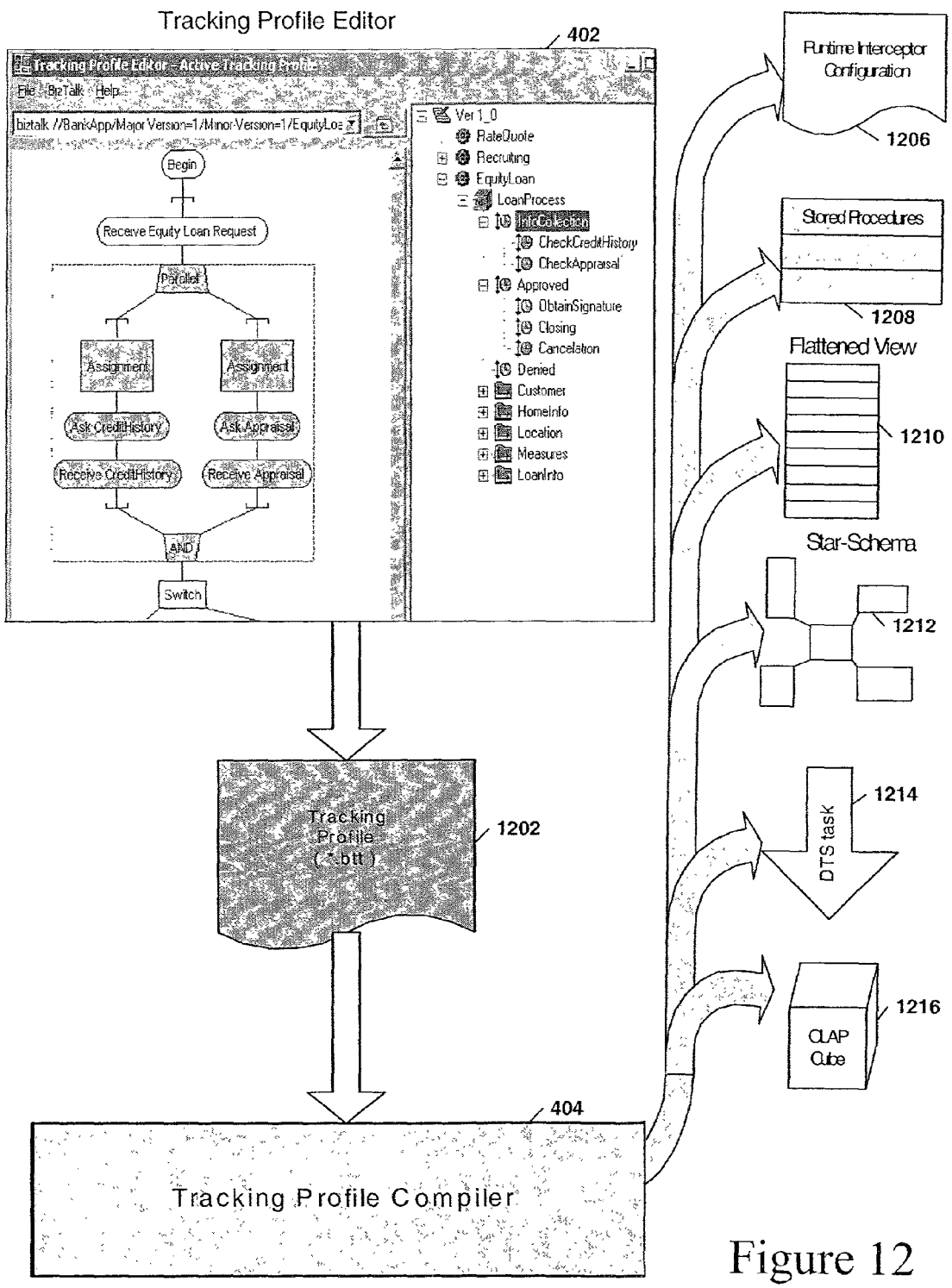
FIG. 12 is a flow diagram illustrating operation of a tracking profile compiler for processing a tracking profile in an illustrative embodiment of the invention.

As shown in FIG. 12, the illustrative embodiment of Tracking Profile Compiler (TPC) 404 receives tracking profile 1202 from TPE 402 and generates a runtime interceptor configuration 1206 to describe process parts and payload data of interest for monitoring purposes, creates stored procedures 1208 for storing payload data into a queryable database, creates a flattened view 1210 (described later) to be used for querying purposes, creates star schema 1212 (described later), creates a Data Transformation Services (DTS) Task 1214 for notifying the OLAP cube to process its aggregations based on data stored in the database, and creates the OLAP cube 1216. It will be understood that a DTS task moves data between or in/out of SQL servers. DTS tasks may run on a scheduled basis (e.g., every fifteen minutes).

Figure 14:
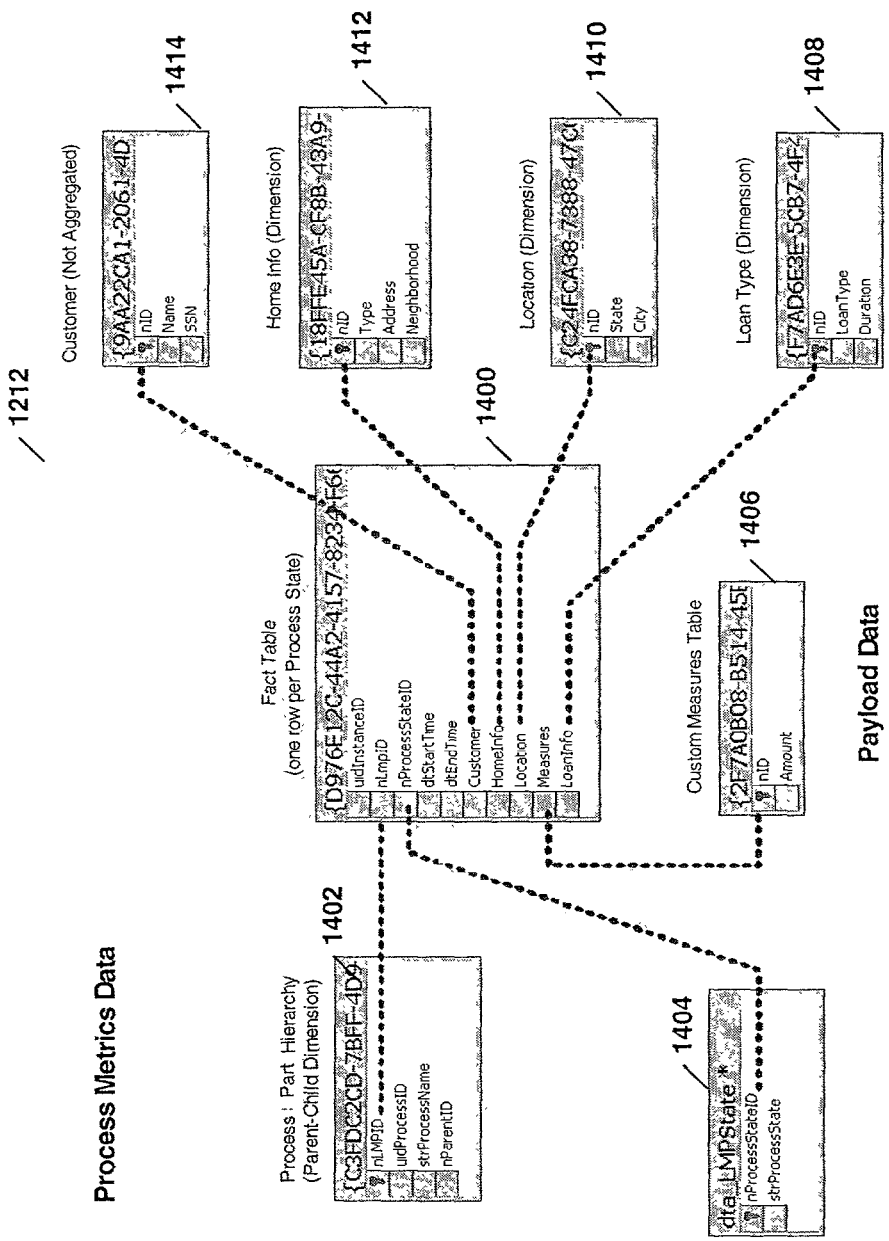
FIG. 14 is a diagram illustrating the format of an exemplary star schema generated by the tracking profile compiler of FIG. 4.

In the illustrative embodiment, star schema 1212 includes a fact table and a table for each dimension, as illustrated in FIG. 14. Using the loan application example, fact table 1400 includes a unique UIDInstanceID, identifying an instance of the workflow, a link (nLmPID) to process part hierarchy table 1402, a link (nProcessStateID) to process state ID table 1404, the start time for this process (dtStartTime), the end time for this process (dtEndTime), a link to Customer data 1414, a link to HomeInfo 1412, a link to Location 1410, a link to Measures 1406, and a link to LoanType 1408. Process part hierarchy table 1402, for providing process part hierarchical information, includes a process ID, a label, such as a name of the process part, and the ID of the parent process. Process state table 1404 includes a process state for a process part. Custom measures table 1406 includes an InstanceID (nID) and Amount, corresponding to the Measures defined in FIG. 11. Customer table 1414, includes name, and SSN (social security number). HomeInfo table 1412 includes Type, Address, and Neighborhood. Location table 1410 includes State and City. LoanType table 708 includes LoanType and Duration.

As can be seen in FIG. 14, each of tables 1408, 1410, 1412 and 1414 corresponds to dimensions. The process state in table 1404, in the exemplary embodiment, includes "running", "completed" and "exception" states, but may include different states or additional states.

Figure 13A:
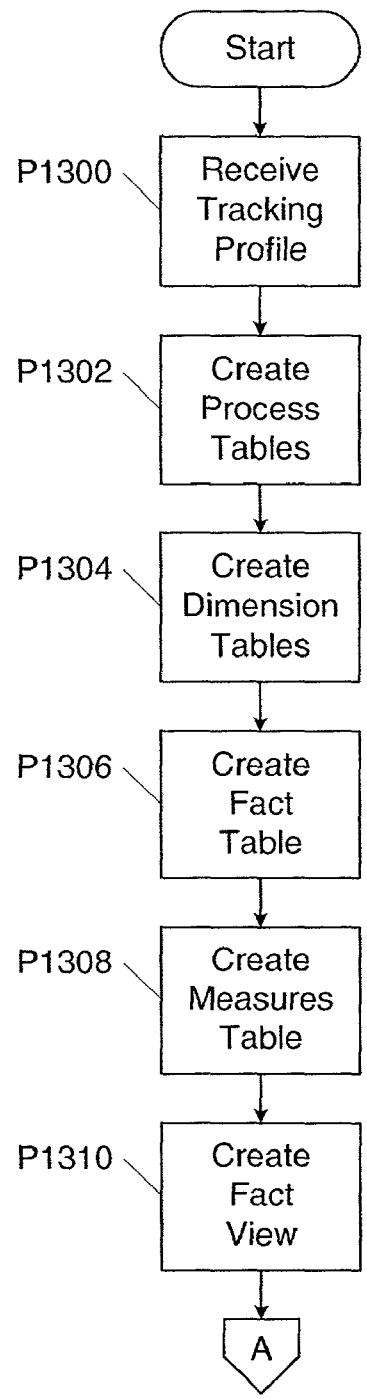
FIGS. 13A and 13B are flowcharts illustrating processing performed by the tracking profile compiler of FIG. 4.
Figure 13B:
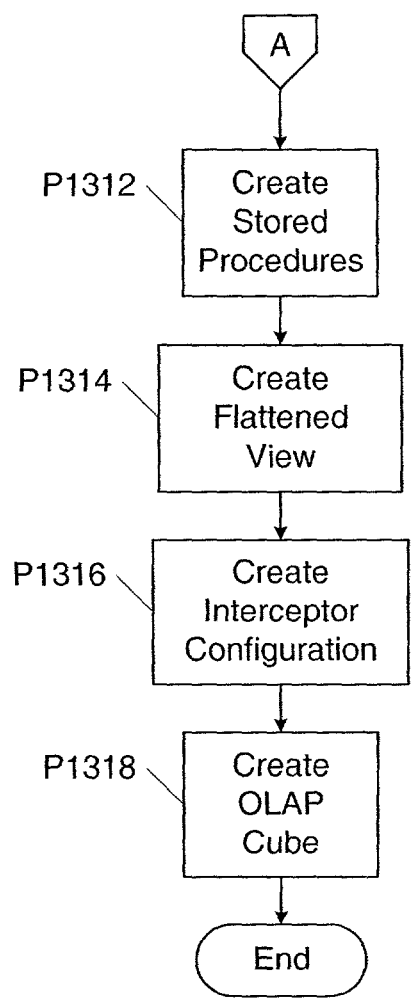

The processing of the TPC is described with reference to flowcharts in FIGS. 13A and 13B. At P1300, a tracking profile is received from TPE 402. At P1302, process state table 1404 and process part hierarchy table 1402 are created. At P1304, dimension tables 1408, 1410, 1412 and 1414 are created. At P1306, fact table 1400 is created. At P1308, Measures table 1406 is created. At P1310, a fact view is created (fact view is a joined fact record and a measures record). At P1312, stored procedures are created (to be described later). At P1314, a flattened view is created (each record in the flattened view is created by joining all the fact records for the respective process parts in a given workflow and all the dimension and custom measure data). At P1316, an interceptor configuration is created (to be described later). At P1318, an OLAP cube is created.

Figure 15:
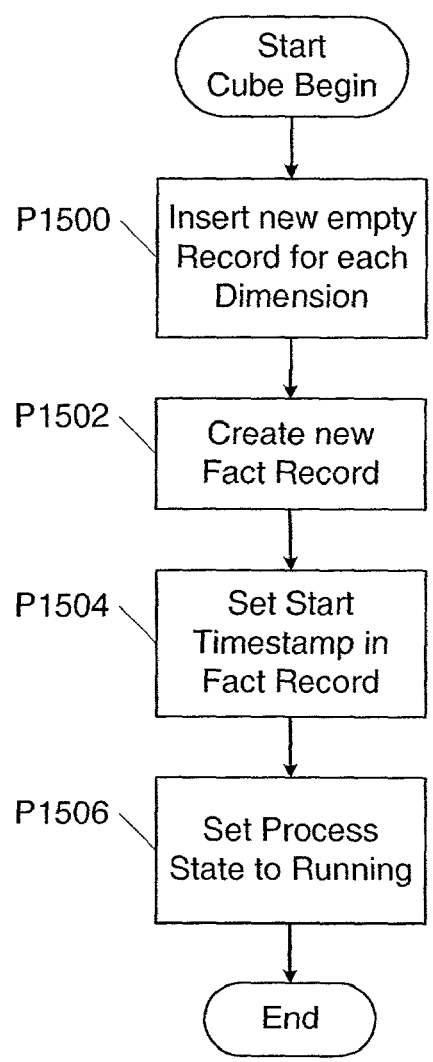
FIG. 15 is a flowchart illustrating processing performed by a cube begin stored procedure generated by the tracking profile compiler shown in FIG. 12.

FIGS. 15 through 19 describe the stored procedures generated by TPC 403. With reference to FIG. 15, a cube begin procedure is explained in an exemplary embodiment of the invention. This procedure is called when the tracking service 408 determines that a schedule instance enters the scope of the cube. At P1500, a new empty record is created for each dimension. With reference to FIG. 14 and the loan application example, records for Customer data, HomeInfo, Location, LoanType, and for measures, such as Amount, are created. A new fact record that has links to the dimension records and the measures, is created at P1502, the start time is determined and stored in the fact record at P1504, and the process state is set to "running" in process state table 1404, at P1506.

Figure 16:
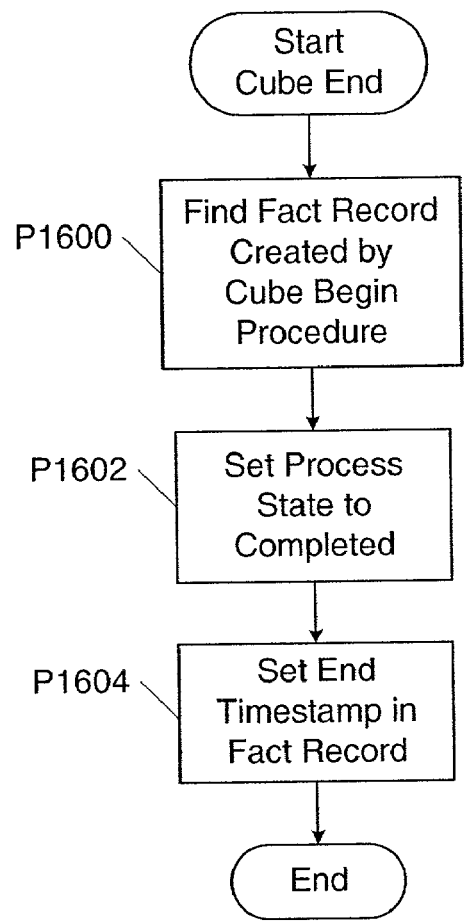
FIG. 16 is a flowchart illustrating processing performed by a cube end stored procedure generated by the tracking profile compiler shown in FIG. 12.

With reference to FIG. 16, a cube end procedure is explained. This procedure is called when the tracking service 408 determines that a schedule instance leaves the scope of the cube. At P1600, the fact record created by the corresponding cube begin procedure is found. At P1602, the process state in process state table 1404 is set to "completed" and at P1604, the end time is set in the end time stamp area of the fact record. With reference to the loan application example of FIG. 7, the process part begin stored procedure will be called when, for example, the Info Collection part is entered, the Credit History Verification part (child) is entered and the Appraisal part (child) is entered.

Figure 17:
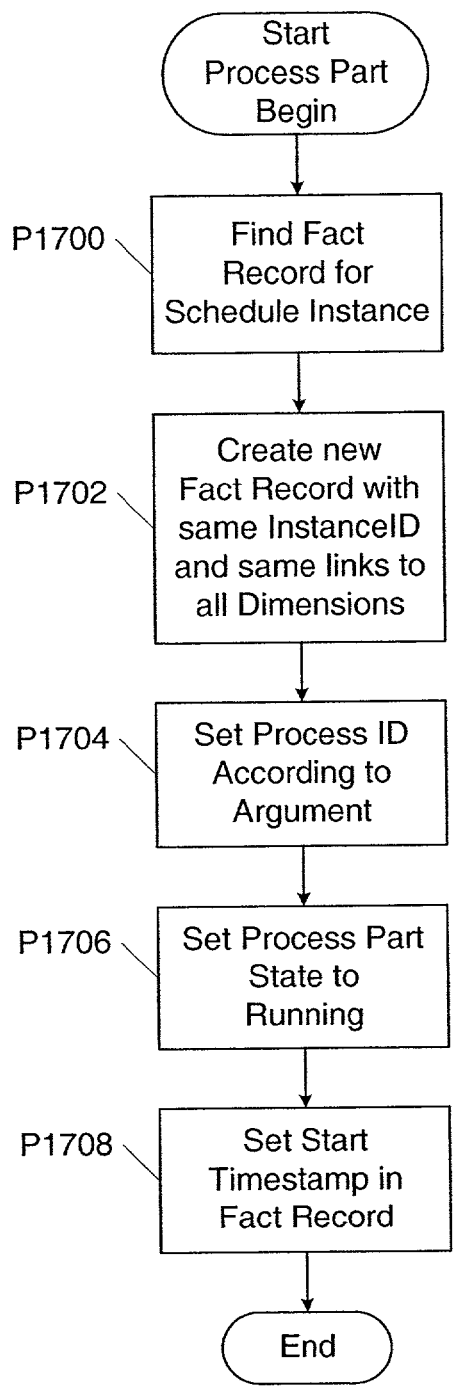
FIG. 17 is a flowchart illustrating processing performed by a process part begin stored procedure generated by the tracking profile compiler shown in FIG. 12.

With reference to FIG. 17, the start process part stored procedure is called when the tracking service 408 determines that a schedule instance enters the scope of the process part. When the start process part stored procedure is called, the fact record for the scheduled instance is found, at P1700. At P1702, a new fact record with the same InstanceID and the same links to the dimension tables is created. At P1704, the ProcessID in the process part hierarchy table 1402 linked to the new fact record, is set according to an argument passed when the stored procedure is called. At P1706, ProcessState in process state table 1404, is set to "running". At P1708, the start time is set in the newly created fact record.

Figure 18:
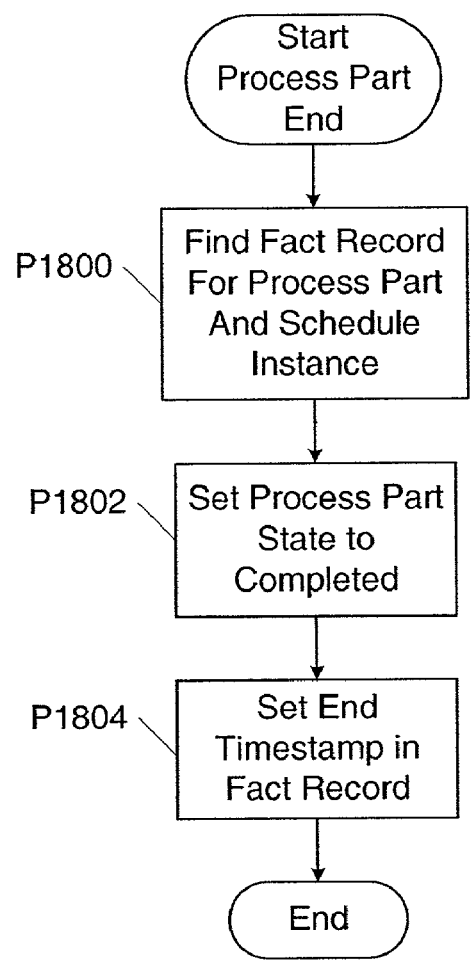
FIG. 18 is a flowchart illustrating processing performed by a process part end stored procedure generated by the tracking profile compiler shown in FIG. 12.

FIG. 18 illustrates the processing performed by the process part end stored procedure. The process part end stored procedure is called when tracking service 408 determines that a scope of a process part is being exited. Using the loan application example, this occurs when leaving, for example, the Credit History Verification or Appraisal process parts. This stored procedure may be called with an argument indicating the ProcessID of the process part whose scope is being exited. At P1800, the fact record corresponding to the process part and schedule instance is found. At P1802, the ProcessState, in table 1404, corresponding to the found fact record is set to "completed". At P1804, the time is set in the EndTimestamp field of the fact record.

Figure 19:
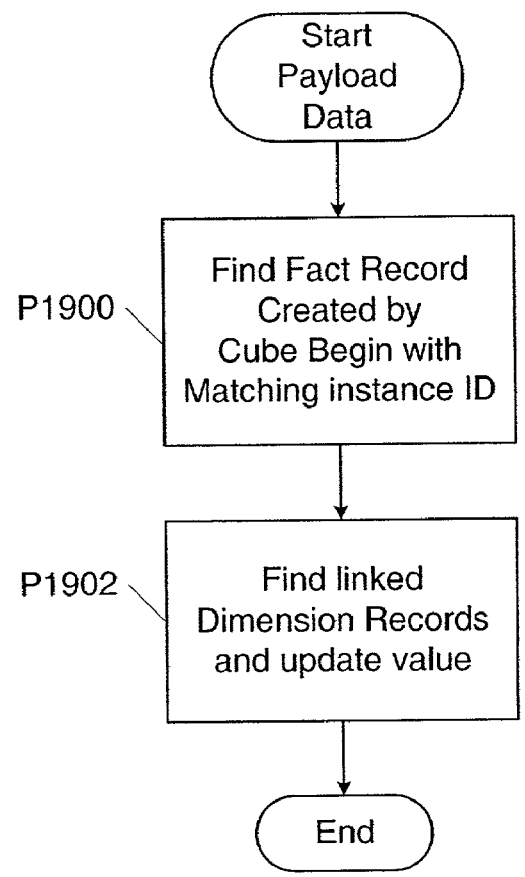
FIG. 19 is a flowchart illustrating processing performed by a payload data stored procedure generated by the tracking profile compiler shown in FIG. 12.

FIG. 19 explains the processing of the stored procedure for payload data. The procedure is called with arguments for all values of the data items. At P1900, since all data items were created by the cube begin stored procedure, the payload data stored procedure finds the fact record created by the cube begin procedure that matches the uidInstanceID. At P1902, the linked dimension records are updated with the values passed as arguments to the payload data stored procedure.

Figure 20:
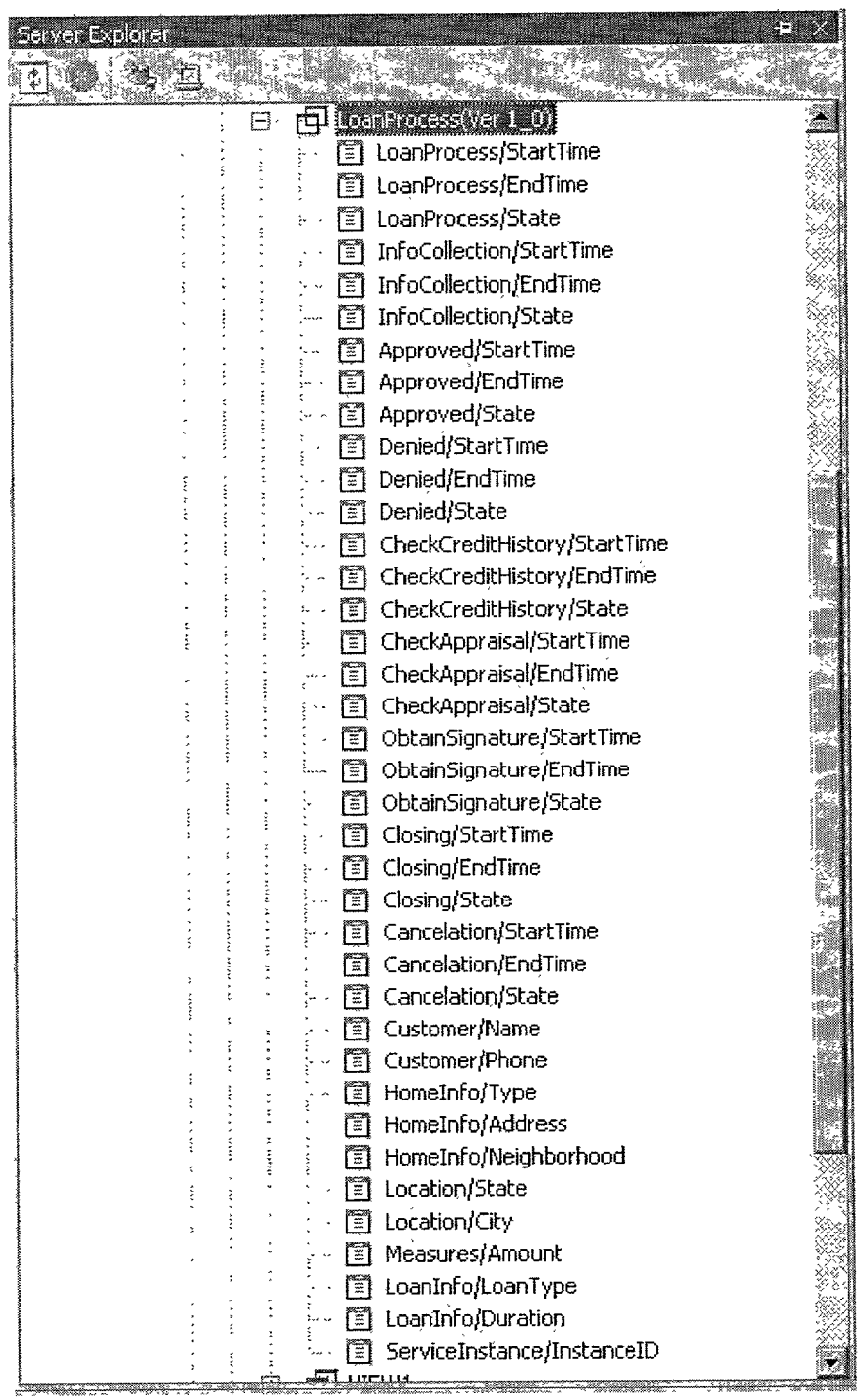
FIG. 20 illustrates an exemplary flattened view of a star schema using the loan application example.

FIG. 20 provides an example of a flattened view for the loan application example. The flattened view is created by joining all records (fact records, dimension records and custom measure records) for a specific schedule instance. In the loan application example, the flattened view record is initially empty, except for the loan process/start time. As the schedule instance runs, the tracking service (to be further described) keeps the record in sync with the process state by processing incoming events from a tracking stream, using the stored procedures. The flattened view can be used to formulate queries, for example, SQL queries, that combine the state of the processes with respect to the meaningful parts defined by the user, and process data.

Each time a new instance of a schedule is created (for example, by receiving a loan application from a customer), an instance of the interceptor is created and an object is initialized with interceptor configuration 1206 (FIG. 12) produced by the tracking profile compiler.

Figure 21:
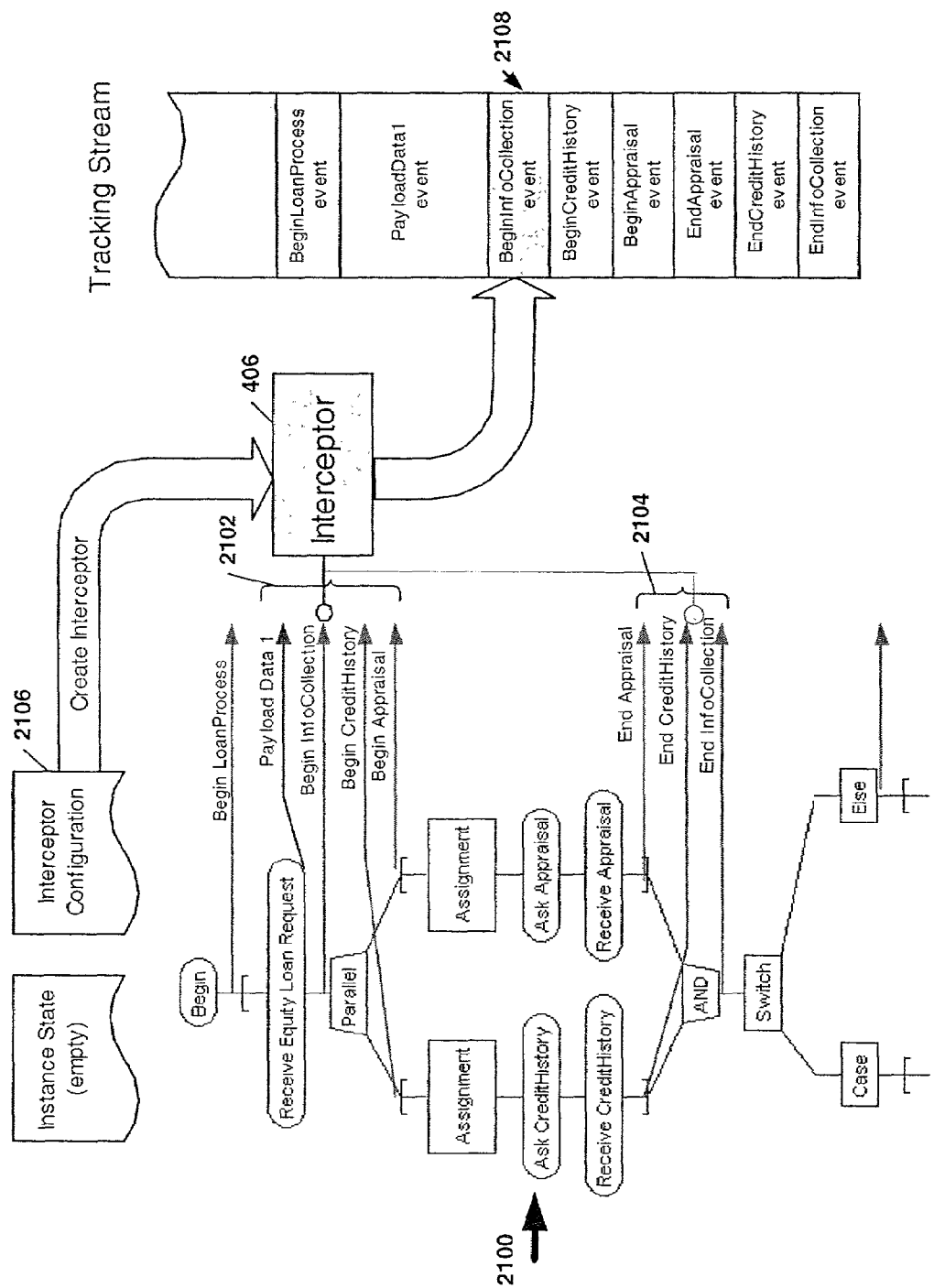
FIG. 21 is a flow diagram illustrating operation of the interceptor shown in FIG. 4.

FIG. 21 shows the loan application workflow 2100 generating begin events 2102 and end events 2104 for each of the defined process parts of interest, in accordance with an exemplary embodiment of the invention. Interceptor 406 references interceptor configuration 1206, created by the tracking profile compiler and which provides information concerning which payload data and events are of interest. Interceptor 406 receives each event or payload data of interest, checks the interceptor configuration to determine whether the event is an event of interest or whether the payload data is payload data of interest, and if so, serializes the event or payload data, along with a timestamp, into tracking stream 2108. If the event is not an event of interest or does not contain payload data of interest, as specified in interceptor configuration 2106, the received event or payload data may be discarded.

Figure 22:
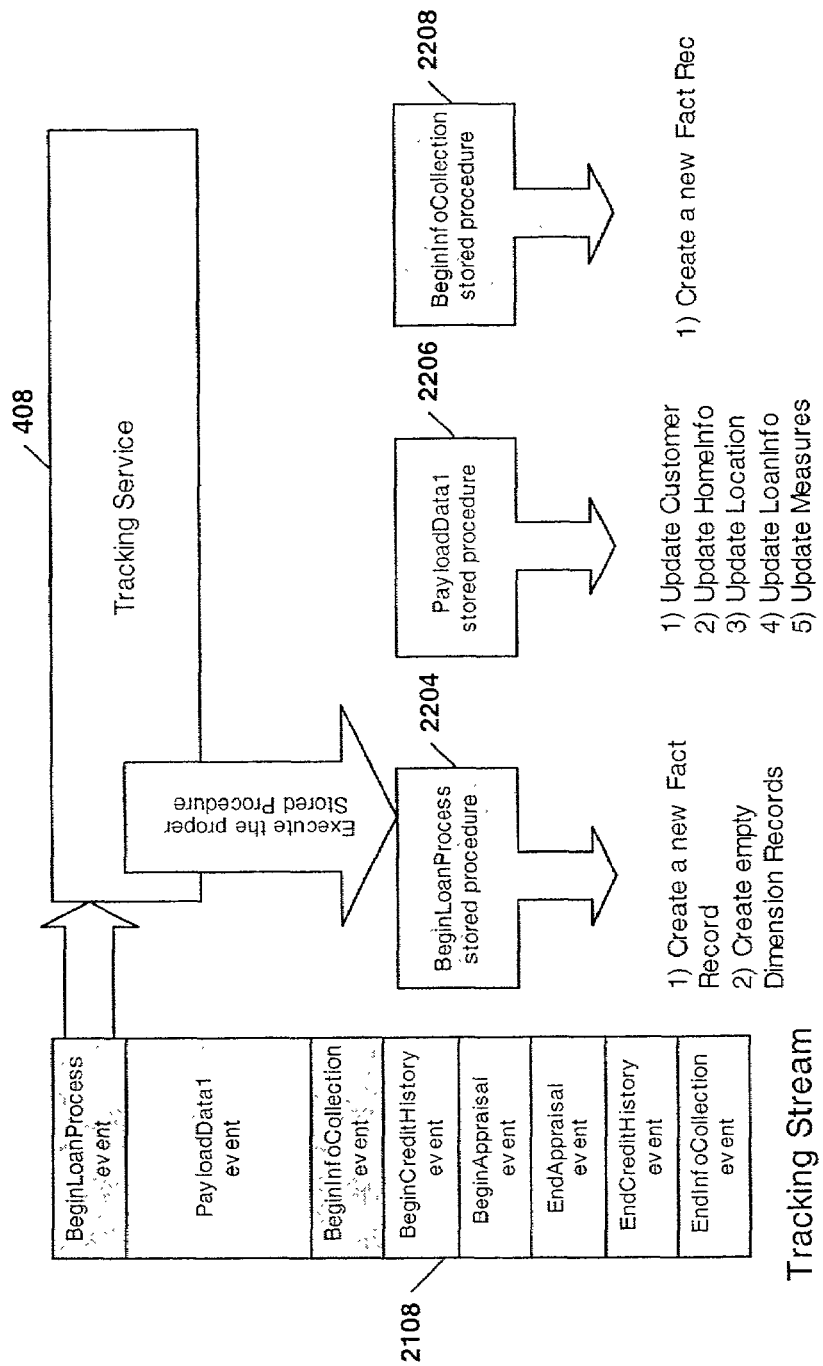
FIG. 22 is a flow diagram illustrating operation of the tracking service shown in FIG. 4.

In the illustrated embodiment, the tracking data is eventually persisted and stored to a tracking database. As illustrated in FIG. 22, the tracking stream 2108 is processed by tracking service 408. Tracking service 408 de-serializes event objects, corresponding to the events, from tracking stream 2108 and executes a proper one of the stored procedures 2204, 2206, 2208 to save the data in a queryable form.

Figure 23:
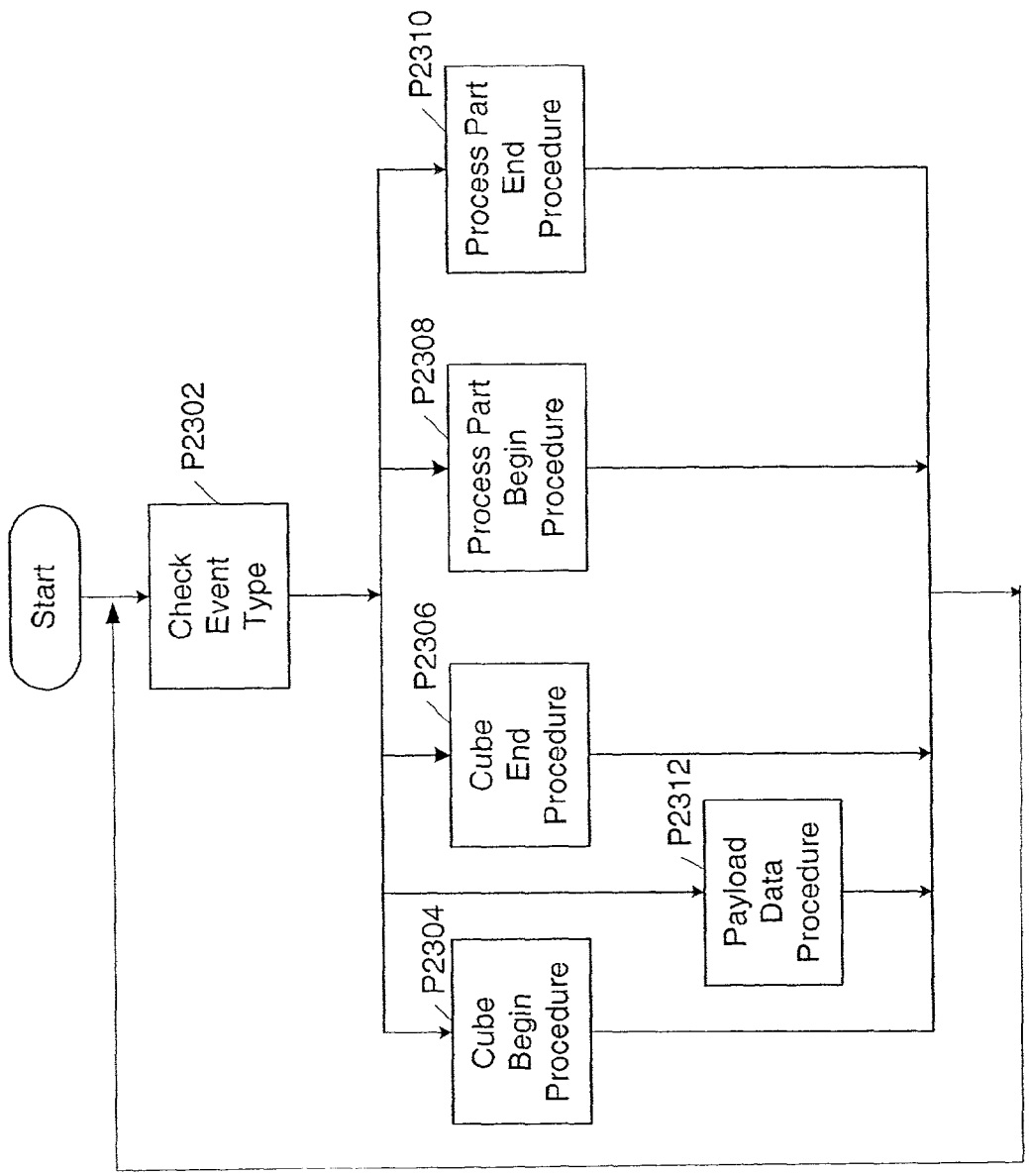
FIG. 23 is a flowchart illustrating processing of the tracking service of FIG. 4.

The processing performed by tracking service 408 is further explained with reference to the flowchart of FIG. 23. At P2302, an event and a timestamp is de-serialized from tracking stream 1200 and the event type is checked. If the event is one of a cube begin event, a cube end event, a process part begin event, a process part end event, or a payload data event, then the stored procedures for the cube begin procedure P2304, the cube end procedure P2306, the process part begin procedure P2308, the process part end procedure P2310, or the payload data procedure P2312 will be performed, respectively. In other words, if a cube begin event is determined at P2302, then P2304 will be performed. If a payload data event is determined at P2302, then P2312 will be performed. If a cube end event is determined at P2302, then P2306 will be performed. If a process part begin event is determined at P2302, then P2308 will be performed. If a process part end event is determined at P2302, then P2310 will be performed. The tracking service will continually monitor the tracking stream and process events, calling the proper stored procedure to store information pertaining to the events in the database.

Alternatively, each event may have a specific event number. A hash table may be accessed using the event number to select an address of the proper stored procedure from the hash table to execute. If no entry corresponding to the event number exists in the hash table, then the event may be ignored.

DTS task 1214 created by TPC 404 (see FIG. 12) periodically updates the OLAP cube from data in the database. The DTS task 1214 may run periodically, for example, every fifteen minutes. At the periodic time interval, the OLAP cube is updated to reflect the current data stored in the database. To simplify updating of the star schema, custom measures may be stored in a custom measures table to which fact records are linked. Further, when using an implementation of an OLAP cube that requires custom measures data to be included in fact records, a fact view of the data may be maintained. Fact records may be joined with custom measures data to create the fact view.

Figure 24:
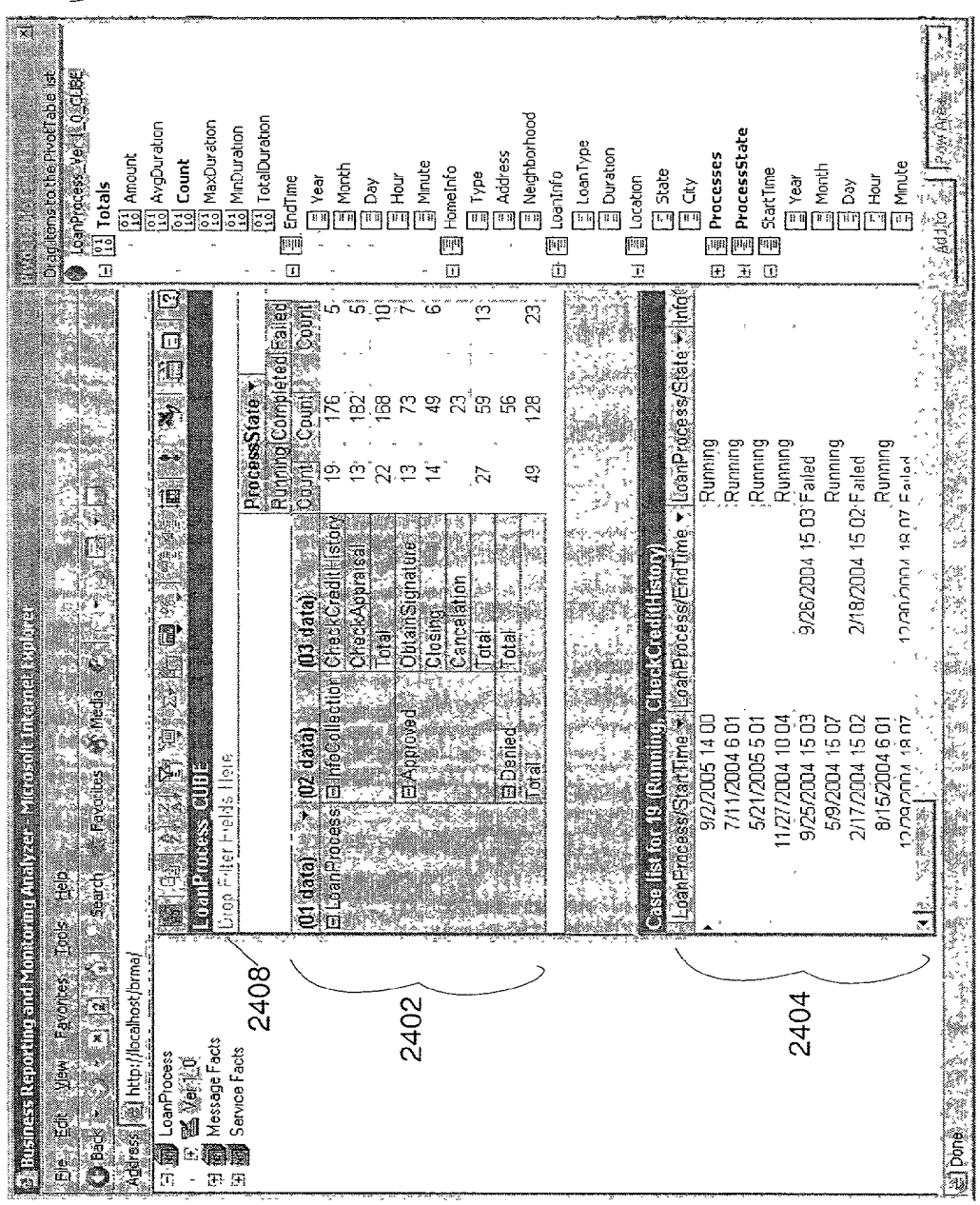
FIG. 24 is a screen shot providing a snapshot of an OLAP cube using the exemplary process part definitions of FIG. 10.

FIG. 24 shows a sample of a snapshot of an exemplary OLAP cube created from the database by reporter 412 (FIG. 4) in response to a query. A user may, but not necessarily, make the query via a browser executing on a separate computer or other device that communicates with reporter 412 via, for example, a network.

At 2408, the exemplary snapshot of the OLAP cube displays the name of the report cube, "LoanProcess", as defined in FIG. 8. The snapshot further shows a table 2402 with row groupings corresponding to the process parts "InfoCollection", "Approved", and "Denied". Within the "InfoCollection" process, parts "CheckCreditHistory" and "CheckAppraisal" are shown as table row labels. Within "Approved", process parts "ObtainSignature", "Closing", and "Cancellation" are shown. Table 2402 has as column labels the process states "Running", "Completed" and "Failed". Under each of these appears the label "Count", indicating a count of the number of instances of each process part according to state. (The displayed measure is "Count.") For example, 19 instances of "CheckCreditHistory" are indicated as being in the "running" state, while 176 instances of process part "CheckCreditHistory" are indicated as being in the "completed" state.

The snapshot further shows the total number of instances of the "InfoCollection", "Approved", and "Denied" process parts, according to process state and the total number of instances of the process parts within the snapshot of the cube, according to process state.

The user may obtain more detailed information from the snapshot. For example, the user may select a process part such as "CheckCreditHistory". The user may make the selection by, for example, double clicking on a cell of Table 2402 containing the name of the process part with a pointing device. When the cell is selected, detailed information may be displayed at 2404. 2404 lists instances of process part "CheckCreditHistory" along with the start time, end time (if ended), and process part state.

Figures 25, 26:
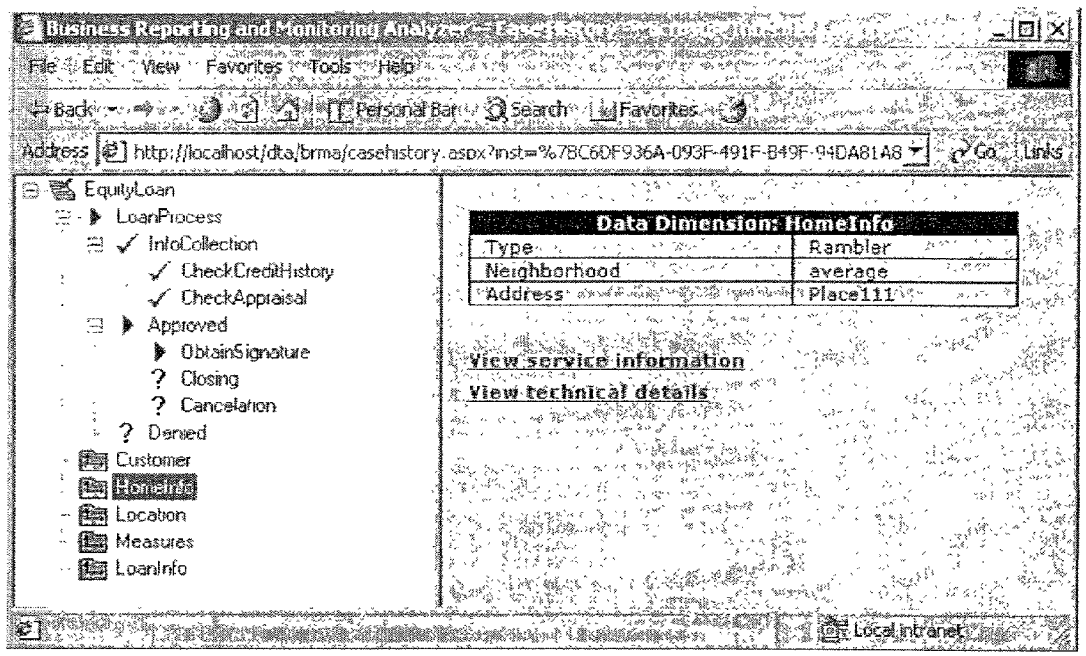
FIG. 25 is a screen shot showing detailed information of the "HomeInfo" item shown in FIG. 24.
FIG. 26 is a screen shot demonstrating results of changing the dimension "Process State" to "Duration" on the display of FIG. 24.

To obtain more information about one of the instances, displayed at 2404, the user may select one of the instances by, for example, double clicking on a field of the instance with a pointing device. The selection may cause reporter 412 to display more detailed information, as shown in FIG. 25. The detailed information may be obtained by displaying data from an instance of the flattened view. The left hand portion 2502 of the exemplary display corresponds to the tree control shown in FIG. 10. The process parts marked with a triangle are running, the process parts marked with a checkmark are successfully completed and the process parts marked with a question mark are not yet executed. When a user selects a data category, the corresponding payload data collected for this instance is shown as Name-Value pairs in the table in frame 2504. When the user selects any of the process parts, the start time, end time and process state are shown. Frame 2504 of the exemplary display of FIG. 25 shows, in more detail, a selected item from 2502 (in this example, data corresponding to "HomeInfo" is displayed).

The user may, by manipulating various items of the snapshot of the cube, shown in FIG. 24, cause reporter 412 to change the data that is displayed. In an embodiment, this may be achieved using PivotTable® from Microsoft's OfficeXP brand web components, although other methods of changing the data may also be used.

For example, the user may select process state "running" and drag this process state label to filter field 2408, and select "duration" from field list 2406 and drag "duration" to the area of the display shown as "ProcessState", thus causing portions 2402, 2408 of the display to change as shown in FIG. 26.

FIG. 26 shows the same process parts as displayed in FIG. 24, however, only information pertaining to the process parts that are in the "running" state, and information pertaining to loan duration, are displayed. For example, process part "CheckCreditHistory", according to the display, has a total of ten instances in the "running" state. Three instances involve loan applications for a duration of 10 years, four instances involve a loan duration of 20 years, and three instances involve a loan duration of 30 years.

By, for example, dragging and dropping "amount" from field list 2406 to one of the cells labeled "count", the display of FIG. 26 changes to that shown in FIG. 27. Note that the cells that were formerly labeled "count" are labeled "amount" in FIG. 27. Thus, FIG. 27 provides information regarding loan amounts. For example, according to FIG. 27, there is a total of $344,000 in loan requests currently "running" in the "CheckCreditHistory" process part. $100,000 of loan requests are for ten year loans, $158,000 of loan requests are for twenty year loans, and $86,000 of loan requests are for thirty year loans.

Figure 28:
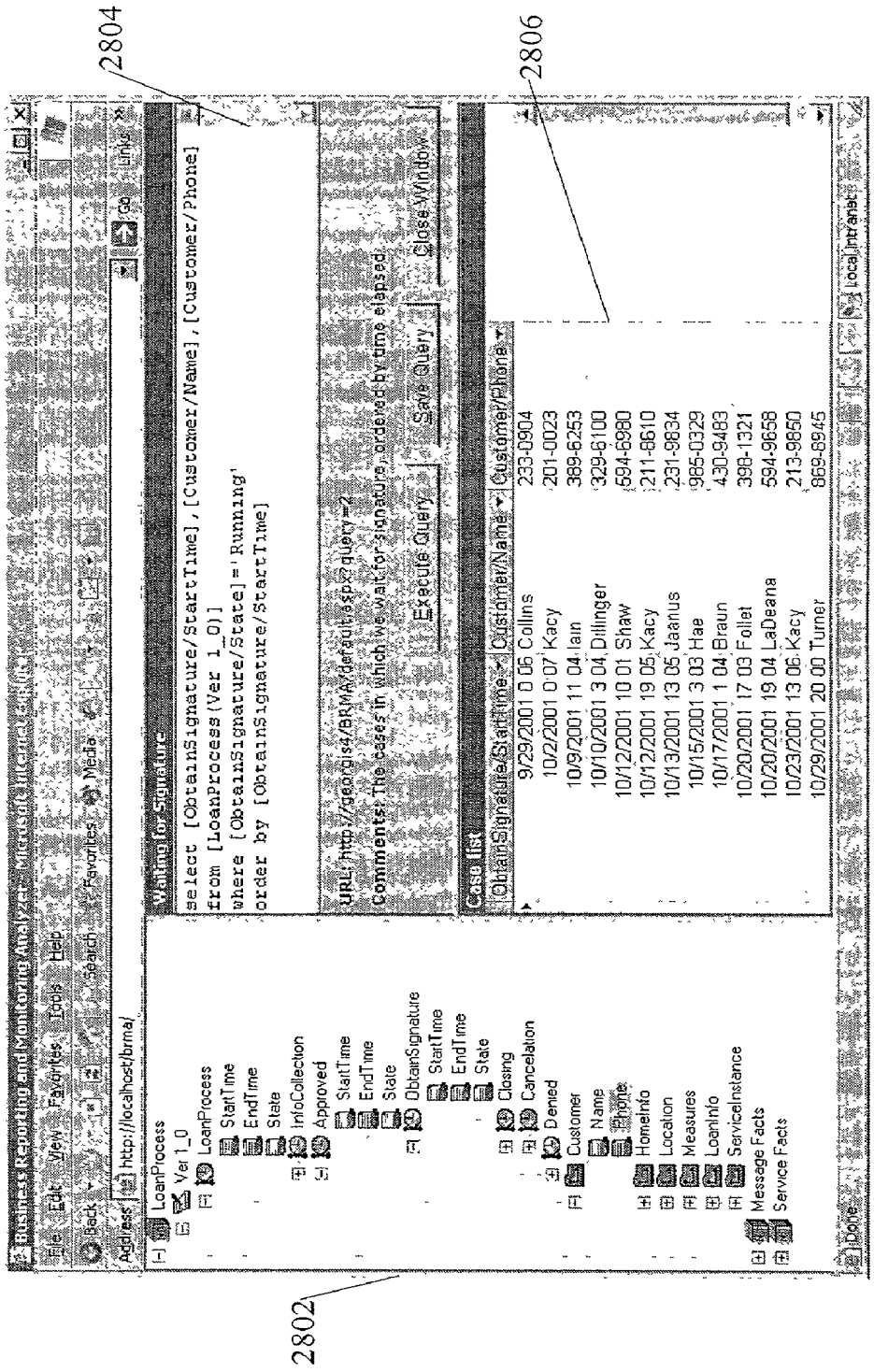
FIG. 28 is a screen shot illustrating performing a query combining process state and process data.

FIG. 28 shows an example of a page being displayed by reporter 412. A user may enter a query, such as the query at 2804, which is a SQL query, although the query may be in any other database language. The query requests the start time for the "ObtainSignature" process part, customer name, and customer phone number for all instances of the process part "ObtainSignature" that are in the "running" state. The output, at 2806, may be obtained by retrieving the proper instances of the flattened view and ordering the instances for display according to the "ObtainSignature" start time. The displayed columns at 2806 may be changed by the user by, for example, selecting a data item from field list 2802 and, for example, dragging and dropping the data item to a cell containing a column title, such at "Customer/Phone", "Customer/Name", or "ObtainSignature/StartTime" to cause the data within the displayed column to change according to the data item dragged and dropped to the cell. Of course, other methods may be used to change the displayed columns. For example, a user may select an item from field list 2802 and then may select a cell containing a column title by, for example, clicking on each of the selected item and the selected cell.

Figure 29:
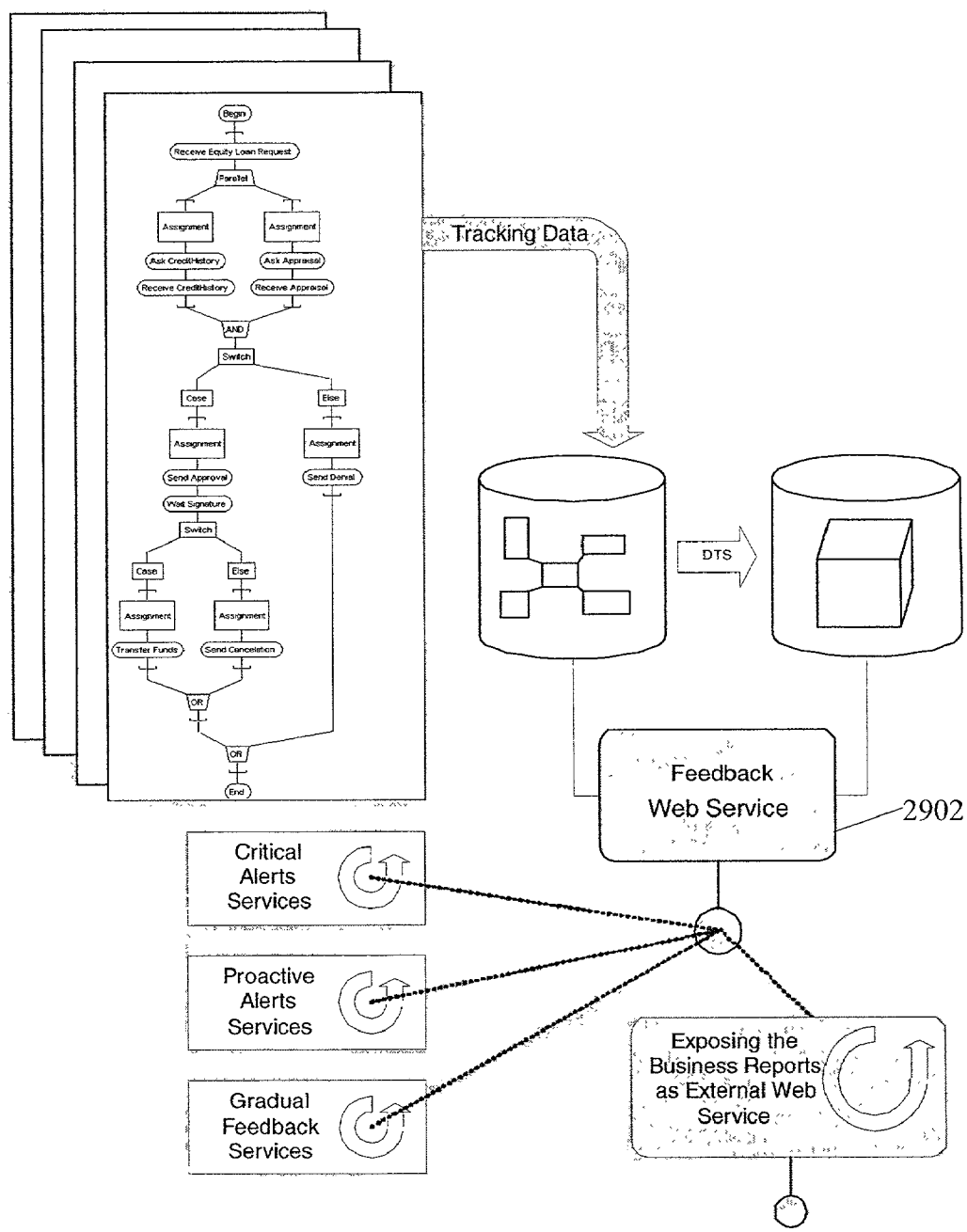
FIG. 29 is a flow diagram illustrating a feedback service in accordance with the invention.

In accordance with an aspect of the invention, FIG. 29 illustrates a feedback service. After tracking service 408 stores the data from tracking stream 2108 in a database in queryable form, predetermined queries can be performed on the data in the tracking database. For example, in an exemplary embodiment, three types of feedback may be received based on the predefined queries. Using the loan application example, a critical alert may be generated when instances of the "ObtainSignature" process part have been in the "running" state for more than three days. Upon detection of a critical alert event, a predefined action may be taken. For example, e-mail may be sent to a loan officer to call a customer to determine why the customer has not yet signed the loan agreement. A proactive alert may be generated when it is determined that the number of customers who are approved, but cancel the loan application, divided by the total number of approved applications is rising. When such a trend is identified, an action may be taken, such as sending an e-mail to the CEO to reconsider the APR. Based on detecting a trend such as the mentioned cancellation trend, gradual feedback services may cause an action to be automatically be taken, such as adjusting the APR within a predefined range. The above alerts and actions are exemplary. Other alerts may be predefined.

In one embodiment of the feedback service, a feedback web service 2902 accepts SQL and Multi-Dimensional Expression (MDX) queries to obtain data from an OLAP cube and returns responsive data in XML format in the form of a report that may (optionally) be exposed on the Internet via an external web service.

In the above embodiments, TPE 402, TPC 404, Interceptor 406, Tracking Service 408, database 410, and reporter 412 may be implemented in hardware, software or firmware. Typically, the items are implemented in software as application programs 196 (FIG. 1) residing in memory, such as RAM. Application programs may further be stored in a medium to be loaded into computer memory. The medium may be hard disk, floppy disk 190, or optical disk 192 (FIG. 1). Other media may be used as well.

Workflow Processing

Figure 30:
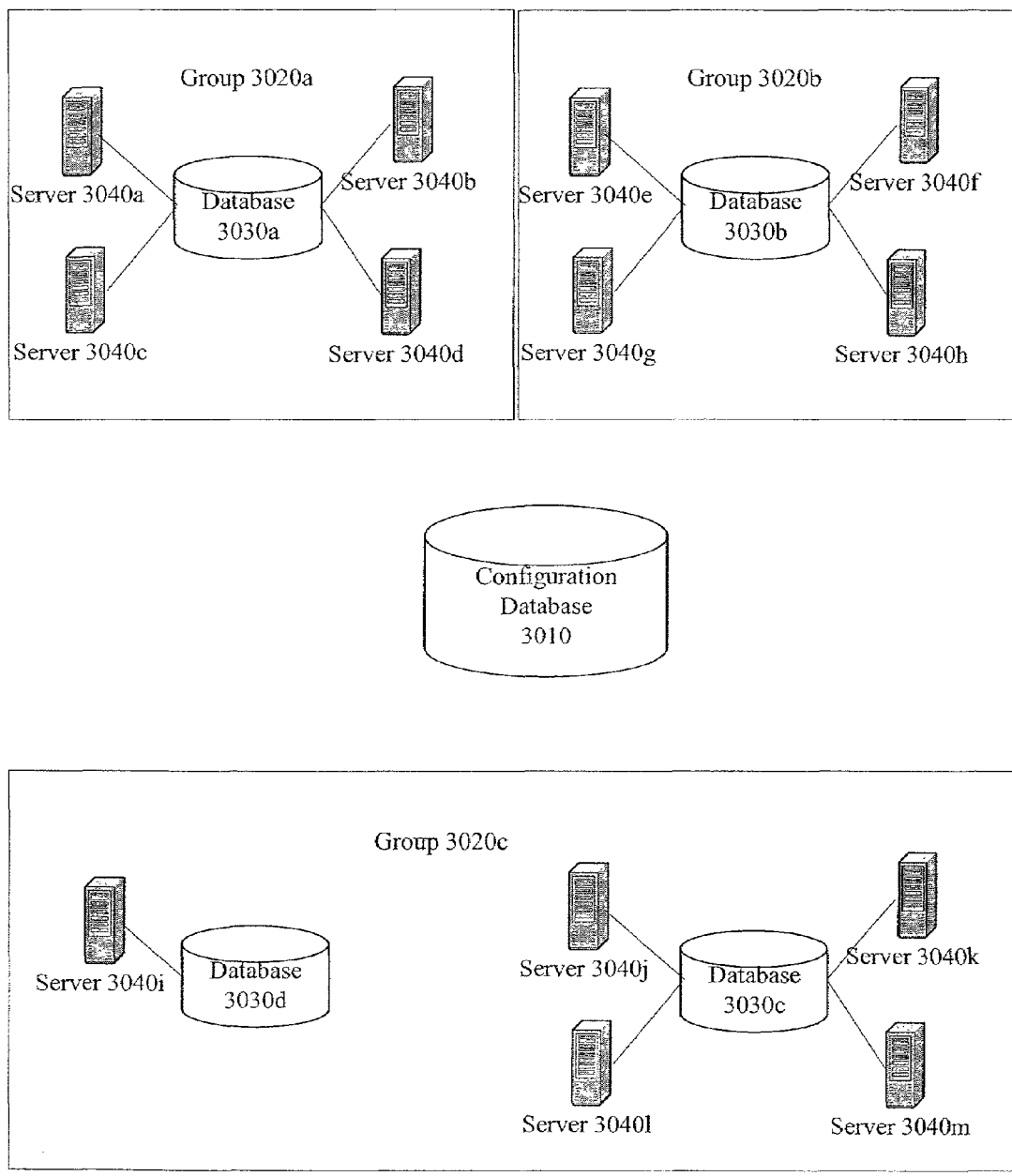
FIG. 30 is a block diagram of a system for modifying and storing state data corresponding to an instance of a process.

With reference to FIG. 30, the following provides details of a system and method for performing workflow processing, of an instance of the workflow, that may be used with the above described aspects of the invention. This system is the subject of a copending commonly owned application entitled, "System and Method for Collecting and Storing Event Data from Distributed Transactional Applications", filed concurrently with the present application, which is hereby incorporated by reference. In one implementation of the present invention, servers that process workflows representing processes, for example, servers that execute Microsoft Corporation's BizTalk™ server software or similar software, may be grouped into one or more administrative groups. For example, servers 3040*a*-3040*d* are assigned to administrative group 3020*a* and database 3030*a*, servers 3040*e*-3040*h* are assigned to administrative group 3020*b* and database 3030*b*, and servers 3040*i*-*m* are assigned to administrative group 3020*c*, wherein server 3040*i* is assigned to database 3030*d* and servers 3040*j*-3040*m* are assigned to database 3030*c*. The identity of each workflow instance and the administrative group assigned to process the workflow instance are stored in configuration database 3010, as shown in FIG. 30.

Each administrative group 3020*a*-3020*c* comprises one or more databases 3030*a*-3030*d*. Data corresponding to the current state of an instance of a process is stored in the database 3020*a*-3030*d* in the group 3020*a*-3020*c* dedicated to the instance. Each database 3030*a*-3030*d* is dedicated to one or more severs 3040*a*-3040*m*. Each server references configuration database 3010 to determine to which administrative group the server belongs and to which database the server is assigned.

When a new message arrives, it is persisted in a message box. When a server is available to perform work, the server checks the message box associated with the particular administrative group. Thus, if more than one server is assigned to an administrative group, the next available server will process the message in the assigned message box. If the message box is assigned to an administrative group, such as group 3020*c*, which has two databases, and if data corresponding to a particular instance associated with the data in the message box is stored in, for example, database 3030*d*, then server 3040*i* associated with database 3030*d* will process the message in the message box because, in this example, only server 3040*i* is associated with database 3030*d*.

When a message is in the message box, the next available server of the administrative group assigned to the instance retrieves state data for the instance from the database 3030*a*-3030*d* dedicated to the server. After the server fully and successfully processes the message, the modified state data is transmitted back to the dedicated database for storage. If the server crashes and loses connection with the dedicated database before the server completes processing the message, the message is left in the message box so that the next available server for the group can process the message. If the processing is completed successfully, the message is purged from the message box.

The server processing the message processes the message and event state data to generate events, such as the events previously mentioned with reference to FIG. 21 and, as mentioned above, stores the modified event state data in the associated database 3030*a*-3030*d*. The interceptor 406 associated with the workflow instance, processes the events, as previously described, and serializes the event state data, which may include payload data and/or a timestamp, into tracking stream 2108, which may be stored in associated database 3030*a*-3030*d*.

Figure 31:
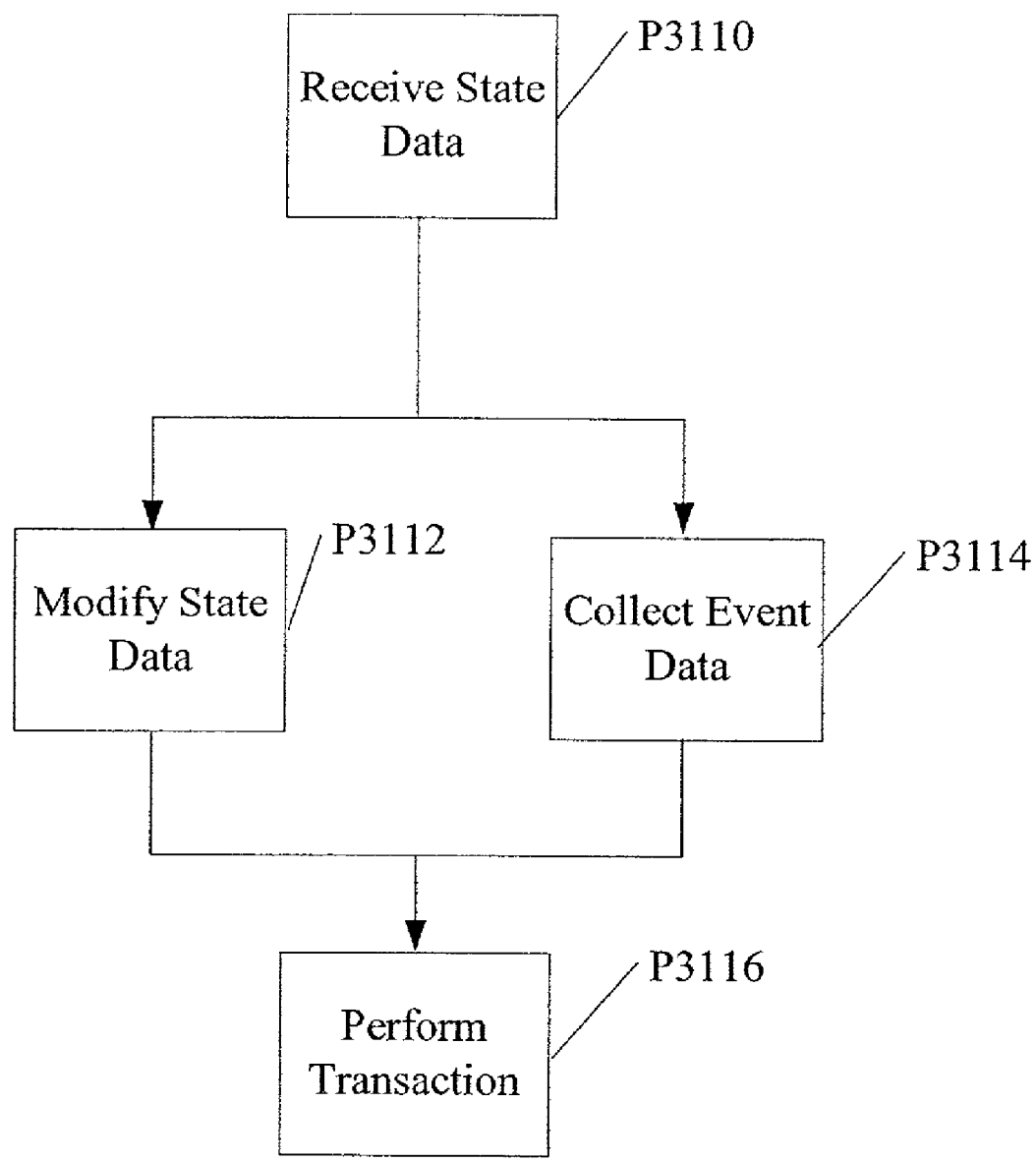
FIG. 31 is a flowchart of a method for collecting and storing event data corresponding to an instance of a process in accordance with an embodiment of the invention.

FIG. 31 is a flowchart of a method for collecting and storing event data corresponding to modification of state data of an instance of a business process in accordance with an embodiment of the invention. An available server 3040*a*-3040*d* detects a message in a message box assigned to the group to which the server belongs. At P3110, the server retrieves from the database 3030*a*-3030*d* dedicated to the server state and event data corresponding to an instance of the process in order to process the message and modify the state data. At P3112, the server processes the message and modifies the state data. At P3114, the interceptor 406 associated with the workflow instance processes collected event data. At P3116, the server performs a transaction with the database to store both the modified state data and the processed event data. If the operation at P3112 or P3114 failed, then the modified state data and the processed event data are not stored to the database, and at P3110, another available server of the group detects the message to be processed in the message box, retrieves the state data and the process continues.

When the transaction at P3116 is successful, the event data is stored in the database in a serialized data stream and the associated message in the message box is purged.

Figure 32:
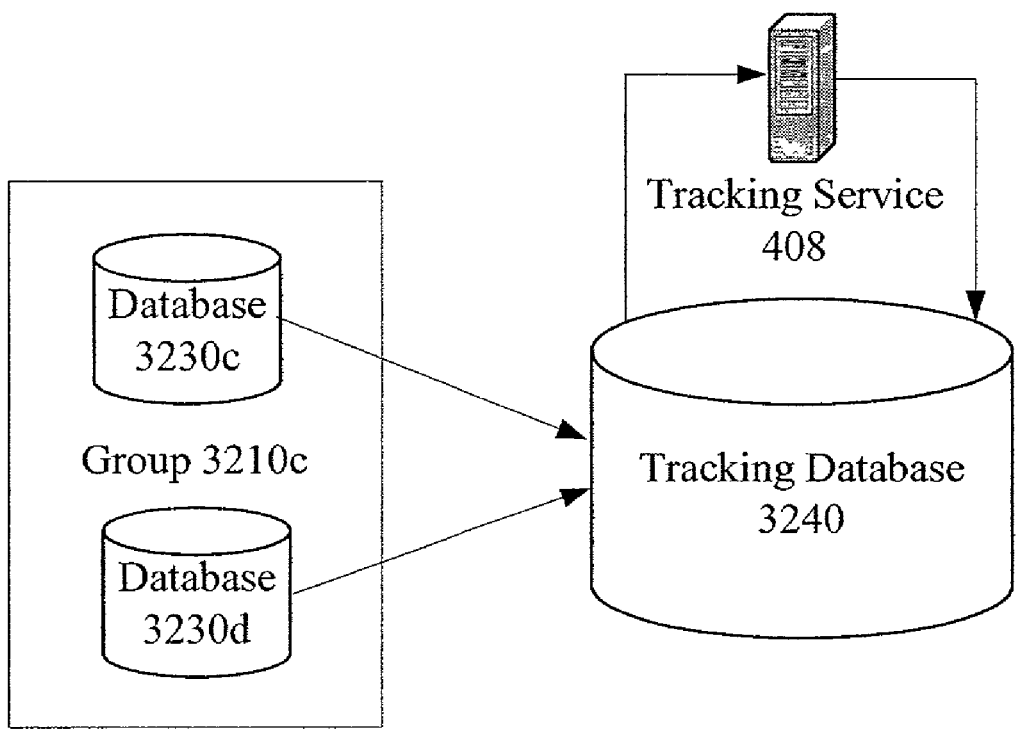
FIG. 32 is a block diagram illustrating storing of event data into a tracking stream in a tracking database and processing of the tracking stream by the tracking service.

With reference to FIG. 32, when an administrative group has more than one associated database, such as databases 3230*c* and 3230*d* of group 3210*c*, databases 3230*c* and 3230*d* may store streams of event data corresponding to a plurality of workflow instances to which group 3020*c* is dedicated. In an embodiment of the invention, each stream of event data is transmitted to tracking database 3240 using a transactional reliable medium such as SQL transactional replication. Tracking database 3240 collects and may organize the data stream from each database 3230*c*-3230*d* into a single tracking stream or may handle each data stream separately. As mentioned previously, tracking service 408 processes the tracking stream stored in tracking database 3240 to store data in a queryable form.

The present invention has been described in terms of preferred and exemplary embodiments thereof. Numerous other embodiments, modifications and variations within the scope and spirit of the appended claims will occur to persons of ordinary skill in the art from a review of this disclosure.

We claim as our invention:

1. A computer-implemented method of establishing a tracking profile for selective monitoring and reporting of process state data pertaining to a workflow representation of a business process, comprising:

displaying the workflow representation of the business process, the workflow representation describing the business process;

selecting at least one portion of the displayed workflow representation and associating the selected portion(s) with respective process part labels; and generating a tracking profile based on the selected workflow representation portion(s), said profile establishing parameters for monitoring and writing to a queryable database process state data pertaining to instances of said process represented within said displayed workflow representation.

2. The method of claim 1, further comprising displaying a hierarchical representation of said process part labels, corresponding to a hierarchy of said selected workflow representation portions.

3. The method of claim 1, wherein said selecting of displayed workflow representation portions comprises selecting a parent workflow representation portion and a child workflow representation portion within said parent workflow representation portion.

4. The method of claim 1, further comprising compiling said tracking profile to generate a corresponding database schema.

5. The method of claim 4, wherein said database schema comprises a flattened view.

6. The method of claim 4, wherein said database schema comprises a star schema.

7. The method of claim 4, wherein said database schema comprises an OLAP cube.

8. The method of claim 1, further comprising compiling said tracking profile to generate a configuration for selectively monitoring process state data pertaining to instances of said processes.

9. The method of claim 1, further comprising compiling said tracking profile to generate a plurality of stored procedures utilized in monitoring and writing to said queryable database process state data pertaining to instances of said process.

10. The method of claim 9 wherein said stored procedures comprise a stored procedure for writing to said database a timestamp indicating an end time of said process instance, and for setting a process completed state indicator for said instance.

11. The method of claim 9, wherein said stored procedures comprise a stored procedure for writing to said database a timestamp indicating a time of entry of a process instance into a selected process part, and for setting a process part running state indicator for said instance.

12. The method of claim 11, wherein said stored procedures comprise a stored procedure for writing to said database a timestamp indicating a time of exit of said process instance from said selected process part, and for setting a process part completed state indicator for said instance.

13. The method of claim 9, wherein said stored procedures comprise a stored procedure for establishing in said database a fact record for each new process instance.

14. A machine readable medium having instructions recorded thereon which, when executed by a data processing device, configure said device:

to display a workflow representation of a business process, the workflow representation describing the business process;

to permit a user to select, with at least one input device, at least one portion of the displayed workflow representation, and to associate the selected portion(s) with respective process part labels; and to generate a tracking profile based on the selected workflow representation portion(s), said profile establishing parameters for monitoring and writing to a queryable database process state data pertaining to instances of said process.

15. The machine readable medium of claim 14 having further instructions recorded thereon, which, when executed by the data processing device, configure said device:

to display a hierarchical representation of said process part labels, corresponding to a hierarchy of said selected workflow representation portions.

16. The machine readable medium of claim 14, wherein said permitting the user to select at least one portion of the displayed workflow representation comprises permitting the user to select a parent workflow representation portion and a child workflow representation portion within said parent workflow representation portion.

17. The machine readable medium of claim 14 having further instructions recorded thereon, which, when executed by the data processing device, configure said device to compile said tracking profile to generate a corresponding database schema.

18. The machine readable medium of claim 17, wherein said database schema comprises a flattened view.

19. The machine readable medium of claim 17, wherein said database schema comprises a star schema.

20. The machine readable medium of claim 17, wherein said database schema comprises an OLAP cube.

21. The machine readable medium of claim 14 having further instructions recorded thereon, which, when executed by the data processing device, configure said device to compile said tracking profile to generate a configuration for selectively monitoring process state data pertaining to instances of said processes.

22. The machine readable medium of claim 14 having further instructions recorded thereon, which, when executed by the data processing device, configure said device to compile said tracking profile to generate a plurality of stored procedures utilized in monitoring and writing to said queryable database process state data pertaining to instances of said process.

23. The machine readable medium of claim 22, wherein said stored procedures comprise a stored procedure for writing to said database a timestamp indicating an end time of said process instance, and for setting a process completed state indicator for said instance.

24. The machine readable medium of claim 22, wherein said stored procedures comprise a stored procedure for writing to said database a timestamp indicating a time of entry of a process instance into a selected process part, and for setting a process part running state indicator for said instance.

25. The machine readable medium of claim 24, wherein said stored procedures comprise a stored procedure for writing to said database a timestamp indicating a time of exit of said process instance from said selected process part, and for setting a process part completed state indicator for said instance.

26. The machine readable medium of claim 22, wherein said stored procedures comprise a stored procedure for establishing in said database a fact record for each new process instance.

* * * * *